US011490423B2

(12) United States Patent
Cui

(10) Patent No.: US 11,490,423 B2
(45) Date of Patent: Nov. 1, 2022

(54) ELECTRONIC DEVICE IN WIRELESS COMMUNICATION SYSTEM, AND WIRELESS COMMUNICATION METHOD

(71) Applicant: Sony Corporation, Tokyo (JP)

(72) Inventor: Tao Cui, Beijing (CN)

(73) Assignee: SONY CORPORATION, Tokyo (JP)

(*) Notice: Subject to any disclaimer, the term of this patent is extended or adjusted under 35 U.S.C. 154(b) by 3 days.

(21) Appl. No.: 16/491,161

(22) PCT Filed: May 16, 2018

(86) PCT No.: PCT/CN2018/087111
§ 371 (c)(1),
(2) Date: Sep. 5, 2019

(87) PCT Pub. No.: WO2019/001160
PCT Pub. Date: Jan. 3, 2019

(65) Prior Publication Data
US 2020/0037366 A1    Jan. 30, 2020

(30) Foreign Application Priority Data

Jun. 29, 2017    (CN) .......................... 201710514706.3

(51) Int. Cl.
*H04W 74/08*    (2009.01)
*H04W 16/14*    (2009.01)
*H04W 16/28*    (2009.01)

(52) U.S. Cl.
CPC ....... *H04W 74/0833* (2013.01); *H04W 16/14* (2013.01); *H04W 16/28* (2013.01); *H04W 74/0808* (2013.01)

(58) Field of Classification Search
CPC . H04W 74/0833; H04W 16/14; H04W 16/28; H04W 74/0808; H04W 74/004; H04B 7/0617; H04B 7/0695
See application file for complete search history.

(56) References Cited

U.S. PATENT DOCUMENTS

| 2014/0226558 A1* | 8/2014 | Speight ............... H04W 52/221 370/315 |
| 2016/0037560 A1 | 2/2016 | Liu |

(Continued)

FOREIGN PATENT DOCUMENTS

| CN | 106413117 A | 2/2017 |
| CN | 106559122 A | 4/2017 |

(Continued)

OTHER PUBLICATIONS

International Search Report and Written Opinion dated Jul. 27, 2018 for PCT/CN2018/087111 filed on May 16, 2018, 8 pages including English Translation of the International Search Report.

(Continued)

*Primary Examiner* — John D Blanton
(74) *Attorney, Agent, or Firm* — Xsensus LLP

(57) ABSTRACT

The present application relates to an electronic device in a wireless communication system, and a wireless communication method. The electronic device in a wireless communication system according to the present application comprises: a processing circuit, configured to perform a channel detection process in one or more beam directions of an unlicensed spectrum; and a transceiver circuit, configured to transmit a random access preamble sequence in one or more beam directions in which channels are detected as idle. The electronic device and the wireless communication method of the present application can implement a random access process on an unlicensed spectrum, improve the channel detection efficiency, and reduce the delay caused by the channel detection process.

13 Claims, 12 Drawing Sheets

(56) References Cited

U.S. PATENT DOCUMENTS

| | | | |
|---|---|---|---|
| 2016/0242213 A1 | 8/2016 | Dabeer et al. | |
| 2016/0269986 A1* | 9/2016 | Bergström | H04W 48/08 |
| 2017/0171887 A1* | 6/2017 | Shi | H04W 74/0816 |
| 2017/0231011 A1* | 8/2017 | Park | H04W 72/0446 |
| 2019/0159249 A1* | 5/2019 | Ahn | H04W 74/08 |
| 2020/0015213 A1* | 1/2020 | Tang | H04B 7/0695 |
| 2020/0022185 A1* | 1/2020 | Luo | H04W 56/001 |
| 2020/0128587 A1* | 4/2020 | Qian | H04W 8/24 |
| 2020/0154326 A1* | 5/2020 | Deenoo | H04W 36/08 |
| 2021/0014897 A1* | 1/2021 | Liu | H04W 74/006 |

FOREIGN PATENT DOCUMENTS

| | | |
|---|---|---|
| CN | 106658751 A | 5/2017 |
| WO | 2016/182385 A1 | 11/2016 |
| WO | 2017/012472 A1 | 1/2017 |
| WO | 2017/081800 A1 | 5/2017 |

OTHER PUBLICATIONS

Extended European search report dated Aug. 17, 2020, in corresponding European patent Application No. 18824565.8, 17 pages.
Huawei et al., "Coexistence and channel access for NR-based unlicensed band operation", 3GPP TSG RAN WG 1 NR Ad Hoc Meeting, R1-1711467, Jun. 27-30, 2017, total 5 pages, Qingdao, China.
Ericsson, "NR four-step random access procedure", 3GPP TSG-RAN WG1 NR adhoc, R1-1700299, Jan. 16-20, 2017, total 6 pages, Spokane, USA.
CMCC,RACH in Gradual UE/Specific (GUS) initial access,3GPP TSG RAN WG1 #87 R1-1612182,Nov. 5, 2016, 2015.

* cited by examiner

ELECTRONIC DEVICE IN WIRELESS COMMUNICATION SYSTEM, AND WIRELESS COMMUNICATION METHOD

CROSS-REFERENCE TO RELATED APPLICATIONS

This application is based on PCT filing PCT/CN2018/087111, filed May 16, 2018, which claims the priority to Chinese Patent Application No. 201710514706.3, titled "ELECTRONIC DEVICE IN WIRELESS COMMUNICATION SYSTEM, AND WIRELESS COMMUNICATION METHOD", filed with the Chinese Patent Office on Jun. 29, 2017, the entire contents of each are incorporated herein by reference.

FIELD

Embodiments of the present disclosure generally relate to the technical field of wireless communications, in particular to an electronic equipment in a wireless communication system and a wireless communication method. More particularly, the present disclosure relates to an electronic equipment as a network side equipment in a wireless communication system, an electronic equipment as a terminal equipment in a wireless communication system, a wireless communication method executed by a network side equipment in a wireless communication system, and a wireless communication method executed by a terminal equipment in a wireless communication system.

BACKGROUND

With the development and evolution of wireless networks, the wireless networks carry more and more services, therefore additional spectrum resources are needed to support a large amount of data transmission. Cellular wireless network operators begin to explore how to use unlicensed frequency bands based on existing LTE (Long Term Evolution) networks. Communication using unlicensed frequency bands can be implemented by a channel detection process, such as LBT (Listen before talk). In LBT, it is determined whether a channel is idle by means of Clear Channel Assessment (CCA) before using the channel. When the channel is idle, the channel can be accessed. When the channel is occupied, the channel cannot be accessed.

In a case that there is a secondary cell in the coverage area of a base station of a primary cell, a terminal equipment may communicate with the base station of the primary cell by using a licensed frequency band, and the terminal equipment may communicate with the base station of the secondary cell by using the unlicensed frequency band. In the above scenario, the terminal equipment may need to perform a random access process with the base station of the secondary cell. In addition, when the terminal equipment communicates with the base station serving the terminal equipment by using the unlicensed frequency band, the terminal equipment may also need to perform a random access process with the base station. However, in current discussion of the 3GPP (3rd Generation Partnership Project), no feasible solution has been proposed for the random access process on an unlicensed frequency band.

Therefore, it is necessary to propose a technical solution to implement a random access process on an unlicensed frequency band.

SUMMARY

This part provides an overview of the present disclosure, rather than a full scope or all features of the present disclosure.

An object of the present disclosure is to provide an electronic equipment and a wireless communication method, to implement a random access process on an unlicensed frequency band.

According to an aspect of the present disclosure, an electronic equipment in a wireless communication system is provided. The electronic equipment includes: a processing circuit configured to perform a channel detection process on one or more beam directions of an unlicensed spectrum, and a transceiver circuit configured to transmit a random access preamble sequence in one or more beam directions in which channel detection is idle.

According to another aspect of the present disclosure, an electronic equipment in a wireless communication system is provided. The electronic equipment includes: a processing circuit configured to determine one or more optimized transmitting beam directions of terminal equipment within the coverage area of the electronic equipment; and a transceiver circuit configured to transmit, to the terminal equipment, beam direction information including the one or more optimized transmitting beam directions.

According to another aspect of the present disclosure, an electronic equipment in a wireless communication system is provided. The electronic equipment includes: a processing circuit configured to perform a channel detection process on one or more beam directions of an unlicensed spectrum; and a transceiver circuit configured to transmit a random access response message in one or more beam directions in which channel detection is idle, the random access response message including a random access preamble sequence received by the transceiver circuit.

According to another aspect of the present disclosure, a wireless communication method executed by electronic equipment in a wireless communication system is provided. The wireless communication method includes: performing a channel detection process on one or more beam directions of an unlicensed spectrum; and transmitting a random access preamble sequence in one or more beam directions in which channel detection is idle.

According to another aspect of the present disclosure, a wireless communication method executed by electronic equipment in a wireless communication system is provided. The wireless communication method includes: determining one or more optimized transmitting beam directions of terminal equipment within the coverage area of the electronic equipment; and transmitting, to the terminal equipment, beam direction information including the one or more optimized transmitting beam directions.

According to another aspect of the present disclosure, a wireless communication method executed by electronic equipment in a wireless communication system is provided. The wireless communication method includes: performing a channel detection process on one or more beam directions of an unlicensed spectrum; and transmitting a random access response message in one or more beam directions in which channel detection is idle, the random access response message including a random access preamble sequence received by the electronic equipment.

With the electronic equipment in a wireless communication system and the wireless communication method provided in the present disclosure, the electronic equipment can perform a channel detection process based on beam directions, and transmit a random access preamble sequence in a beam direction in which channel detection is idle. In this way, the efficiency of channel detection can be improved and the delay caused by the channel detection process can be reduced. Further, a random access process on an unlicensed frequency band is implemented.

Further applicability range is apparent from the description provided herein. The descriptions and specific examples in the overview are merely for the purpose of illustration and are not intended to limit the scope of the present disclosure.

BRIEF DESCRIPTION OF THE DRAWINGS

The drawings described herein are provided merely for the purpose of illustrating the selected embodiments rather than all possible embodiments, and are not intended to limit the scope of the present disclosure. In the drawings.

Figure 1:
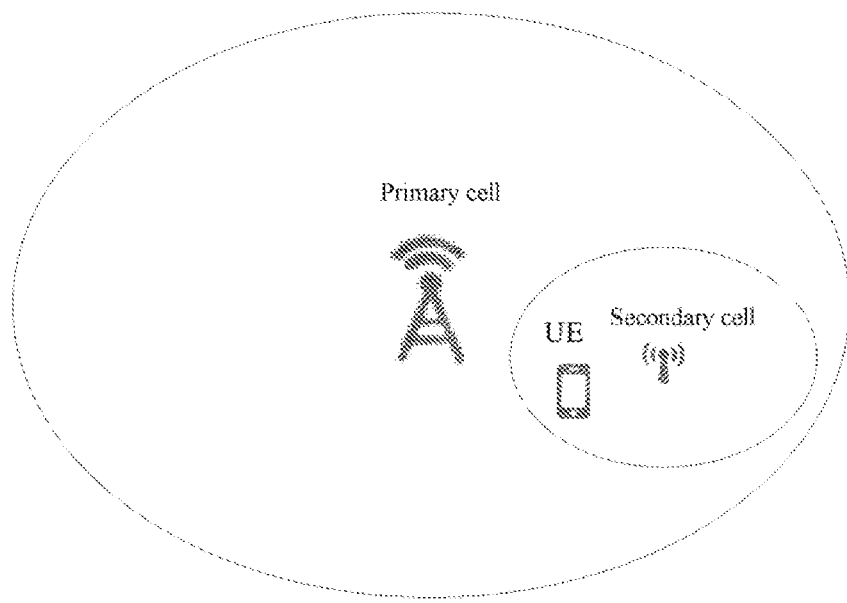
FIG. 1 is a schematic diagram showing an application scenario of the present disclosure.
Figure 1:
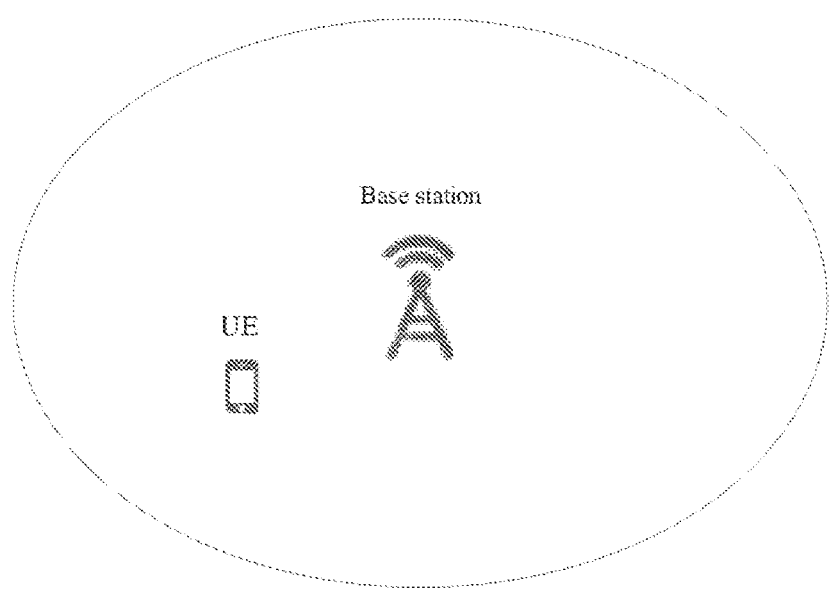

While specific embodiments of the present disclosure are shown as examples in the drawings and are described herein in detail, various modifications and variations may be made to the present disclosure. It should be understood that the description for the specific embodiments herein is not intended to limit the present disclosure to the disclosed specific forms, and the present disclosure is intended to encompass all modifications, equivalents and alternatives that fall within the spirit and scope of the present disclosure. It should be noted that reference numerals indicate parts corresponding to the reference numerals throughout the drawings.

DETAILED DESCRIPTION OF EMBODIMENTS

Examples of the present disclosure are described more fully with reference to the drawings. The following description is merely exemplary rather than being intended to limit the present disclosure and applications or purposes of the present disclosure.

Exemplary embodiments are provided to make the present disclosure be exhaustive and fully convey the scope of the present disclosure to those skilled in the art. Various specific details such as specific components, devices and methods are set forth to provide thorough understanding for the embodiments of the present disclosure. It is apparent to those skilled in the art that the exemplary embodiments may be embodied in many different forms without the specific details, and the specific details are not interpreted as a limit for the scope of the present disclosure. In some exemplary embodiments, well-known processes, well-known structures and well-known technology are not described in detail.

The present disclosure is described below in the following order:
1. Application Scenario;
2. First Embodiment;
3. Second Embodiment;
4. Third Embodiment;
5. Fourth Embodiment;
6. Fifth Embodiment;
7. Sixth Embodiment;
8. Application Example.

1. Application Scenario

FIG. 1(*a*) is a schematic diagram showing an application scenario of the present disclosure. As shown in FIG. 1(*a*), there is one or more secondary cells in the coverage area of a primary cell, and there is a UE (User Equipment) in the coverage area of the secondary cell. Both a base station of the primary cell and a base station of the secondary cell can provide services for the UE. In this scenario, the UE may communicate with the base station of the primary cell by using a licensed frequency band and the UE may communicate with the base station of the secondary cell by using an unlicensed frequency band. In such a scenario, the UE may need to randomly access the base station of the secondary cell.

FIG. 1(b) is a schematic diagram showing another application scenario of the present disclosure. As shown in FIG. 1(b), there is a UE in the coverage area of the base station, and the base station can provide services for the UE. In this scenario, the UE communicates with the base station by using an unlicensed frequency band, and the UE may need to randomly access the base station.

In addition, the frequency band of the NR (New Radio) communication system is a frequency band having high frequency points (for example, 60 GHz). Therefore, in the NR communication system, beamforming formed by a dense multi-antenna array at the transmitting end and receiving end can achieve reliable communication in a specific transmission direction. In the application scenario shown in FIG. 1(a), the UE may communicate with the primary cell by using the licensed frequency band in the NR communication system, and the UE may communicate with the base station of the secondary cell by using the unlicensed frequency band in the NR communication system, that is, the UE and the base station of the primary cell and the base station of the secondary cell may operate in the NR communication system. In the application scenario shown in FIG. 1(b), the UE may communicate with the base station by using the unlicensed frequency band in the NR communication system, that is, the UE and the base station may operate in the NR communication system.

FIG. 1(a) and FIG. 1(b) illustrate exemplary application scenarios of the present disclosure, and the application scenario of the present disclosure is not limited thereto. The technical solution of the present disclosure is applicable to all communication systems that need to perform a random access process on an unlicensed frequency band.

In addition, the base station in the present disclosure may be, for example, an eNB, or may be a gNB (a base station in a 5th generation communication system), which is not limited in this disclosure.

2. First Embodiment

Figure 2:
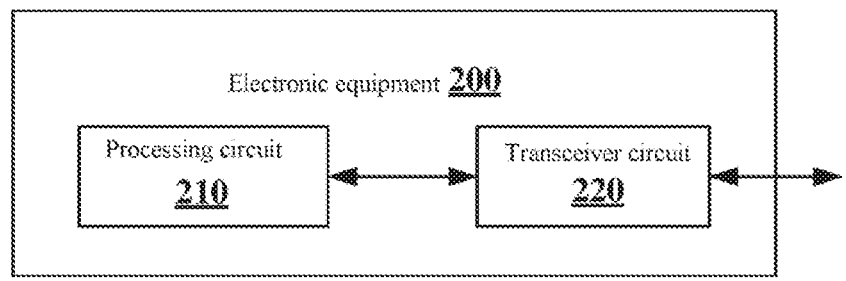
FIG. 2 is a block diagram showing a configuration example of an electronic equipment according to an embodiment of the present disclosure.

In this embodiment, a terminal equipment according to an embodiment of the present disclosure is described in detail. FIG. 2 is a block diagram showing a configuration example of an electronic equipment 200 according to an embodiment of the present disclosure. The electronic equipment 200 may be used as a terminal equipment in a wireless communication network, such the UE shown in FIG. 1(a) and FIG. 1(b). Furthermore, the communication system including the electronic equipment 200 may be an NR communication system.

As shown in FIG. 2, the electronic equipment 200 includes a processing circuit 210 and a transceiver circuit 220. It should be noted that the electronic equipment 200 may include one processing circuit 210 or multiple processing circuits 210.

Further, the processing circuit 210 may include various discrete functional units to perform various different functions and/or operations. It should be noted that the functional units may be physical entities or logical entities, and units referred to as different names may be implemented by a same physical entity.

According to an embodiment of the present disclosure, the processing circuit 210 may perform a channel detection process on one or more beam directions of an unlicensed spectrum.

The processing circuit 210 may perform the channel detection process by using any method known in the art. For example, the processing circuit 210 may perform an LBT process, to check whether a channel is idle by means of Clear Channel Assessment. According to an embodiment of the present disclosure, the processing circuit 210 may perform the channel detection process on each of the one or more beam directions. That is, the processing circuit 210 may perform the channel detection process on a specific beam direction. That is, the processing circuit 210 may perform a listening operation on the specific beam direction to determine whether the specific beam direction is idle. In a case that the specific beam direction is idle, it is indicated that no equipment is transmitting data in the particular beam direction, or interference caused by the equipment transmitting data in the particular beam direction is within a predetermined range, in this case, the electronic equipment 200 can use the particular beam direction. Furthermore, the processing circuit 210 may determine a random access preamble sequence to be transmitted in beam directions in which channel detection is idle.

According to an embodiment of the present disclosure, the transceiver circuit 220 may transmit a random access preamble sequence in one or more beam directions in which channel detection is idle.

The transceiver circuit 220 may acquire, from the processing circuit 210, one or more beam directions in which channel detection is idle and the random access preamble sequence to be transmitted. Then the transceiver circuit 220 may transmit the random access preamble sequence in the one or more beam directions in which channel detection is idle.

As can be seen, according to an embodiment of the present disclosure, the electronic equipment can perform a channel detection process based on beam directions, and transmit a random access preamble sequence in a beam direction in which channel detection is idle. In this way, the efficiency of channel detection can be improved and the delay caused by the channel detection process can be reduced. Further, a random access process on an unlicensed frequency band is implemented.

According to an embodiment of the present disclosure, the processing circuit 210 may perform the channel detection process on the one or more beam directions in sequence. The processing circuit 210 may determine an order of the beam directions, on which the channel detection process is performed, according to a certain criteria.

According to an embodiment of the present disclosure, the processing circuit 210 may perform the channel detection process on each of all beam directions formed by the electronic equipment 200. That is, the one or more beam directions, on which the channel detection process is performed, are all beam directions formed by the electronic equipment 200. There is a beam, capable of transmitting a random access preamble sequence or other information, in each beam direction.

Figure 3:
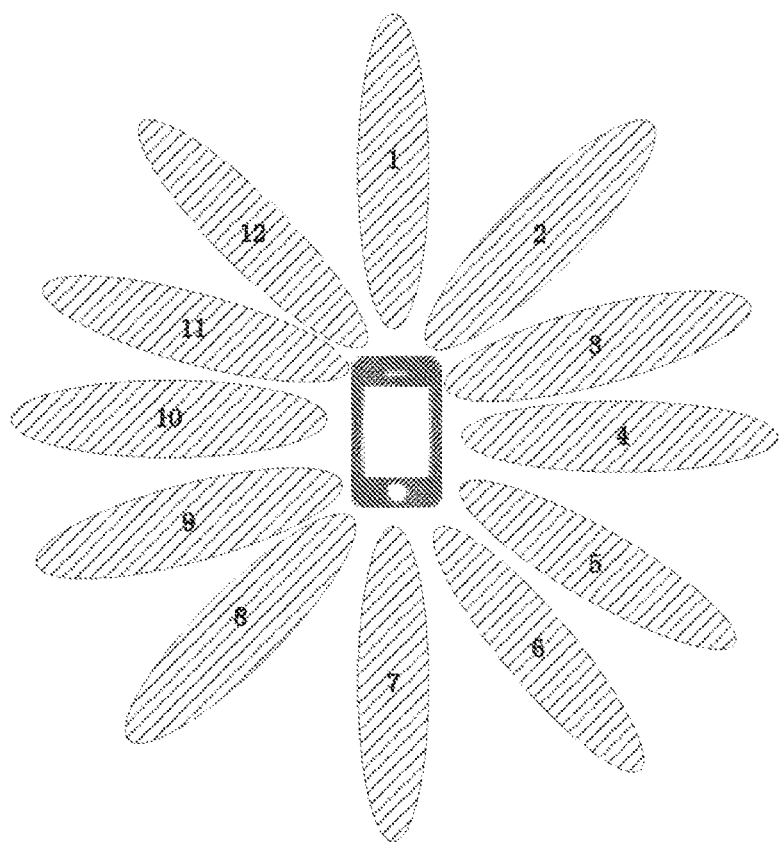
FIG. 3 is a schematic diagram of beam directions, on which a channel detection process is performed, according to an embodiment of the present disclosure.

FIG. 3 is a schematic diagram of beam directions, on which a channel detection process is performed, according to an embodiment of the present disclosure. As shown in FIG. 3, there are 12 beam directions numbered 1 to 12 around the electronic equipment 200. The processing circuit 210 may perform the channel detection process on each of the 12 beam directions, and determine beam directions in which channel detection is idle. There is a beam, capable of transmitting a random access preamble sequence or other information, in each of the 12 beam directions shown in FIG. 3. For example, in a case that the processing circuit 210 determines that the beam directions numbered 1, 2, and 4 are idle, the transceiver circuit 220 may transmit the random access preamble sequence on the beam directions numbered 1, 2, and 4. It should be noted that, although FIG. 3 shows an example in which there are 12 beam directions around the electronic equipment 200, the present disclosure is not limited thereto, and there may be beam directions, the number of which is greater than 12 or less than 12 around the electronic equipment 200.

According to an embodiment of the present disclosure, the transceiver circuit 220 may receive beam direction information and the processing circuit 210 may perform the channel detection process on one or more beam directions included in the beam direction information in sequence.

According to an embodiment of the present disclosure, in a scenario such as that shown in FIG. 1(*a*), the transceiver circuit 220 may receive beam direction information from other devices, such as the base station of the primary cell. The one or more beam directions included in the beam direction information may be preferred transmitting beams of the electronic equipment 200. Since the electronic equipment 200 is located within the coverage area of the base station of the primary cell, the base station of the primary cell can know all relevant information of the electronic equipment 200, and the base station of the primary cell can determine information about optimal transmitting beams of the electronic equipment 200. The transceiver circuit 220 may receive the beam direction information from the base station of the primary cell through a licensed spectrum. Moreover, in a scenario such as that shown in FIG. 1(*b*), the transceiver circuit 220 may receive the beam direction information from the base station, the beam direction information also includes preferred transmitting beams of the electronic equipment 200.

According to an embodiment of the present disclosure, the beam direction information received by the transceiver circuit 220 may include one or more beam directions. Further, the beam direction information received by the transceiver circuit 220 may further include a preference order of the one or more beam directions.

According to an embodiment of the present disclosure, after the electronic equipment 200 receives the beam direction information, the processing circuit 210 may perform the channel detection process on one or more beam directions included in the received beam direction information. That is, the one or more beam directions, on which the channel detection process is performed, refer to beam directions included in the beam direction information received by the electronic equipment 200. Further, in a case that the beam direction information received by the electronic equipment 200 includes a preference order, the processing circuit 210 may perform the channel detection process on one or more beam directions according to the preference order included in the beam direction information.

Figure 4:
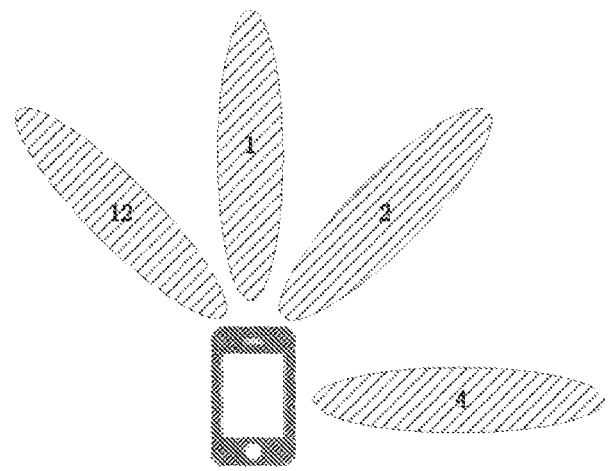
FIG. 4 is a schematic diagram of beam directions, on which a channel detection process is performed, according to another embodiment of the present disclosure.

FIG. 4 is a schematic diagram of beam directions, on which a channel detection process is performed, according to another embodiment of the present disclosure. As shown in FIG. 4, assuming that the beam direction information received by the transceiver circuit 220 includes beam directions numbered 1, 2, 4, and 12, the processing circuit 210 may perform the channel detection process only on the above four beam directions. Further, assuming that the preference order included in the beam direction information received by the transceiver circuit 220 is the beam direction 2, the beam direction 1, the beam direction 4, and the beam direction 12, the processing circuit 220 may perform the channel detection process on the beam direction 2, the beam direction 1, the beam direction 4, and the beam direction 12 in the listed order.

According to the above-described embodiment of the present disclosure, the electronic equipment 200 may perform the channel detection process only on the beam directions included in the received beam direction information, thereby narrowing the range of beam directions in which the channel detection process is to be performed, and saving the time for channel detection.

According to an embodiment of the present disclosure, each of the one or more beam directions on which the channel detection process is performed may include multiple sub-beam directions. There is a beam, capable of transmitting a random access preamble sequence or other information, in each sub-beam direction. That is, the processing circuit 210 may combine multiple sub-beams into one beam. The number of sub-beams included in each beam may be the same or different. According to an embodiment of the present disclosure, the processing circuit 210 may perform the channel detection process on each beam. If a channel detection result of the beam is idle, it means that all the sub-beams included in the beam are idle, in this case, the electronic equipment 200 may use all the sub-beams in the beam to transmit the random access preamble sequence.

According to an embodiment of the present disclosure, the transceiver circuit 220 may transmit the random access preamble sequence in the multiple sub-beam directions included in each beam direction in which channel detection is idle. That is, in the above embodiment, the one or more beam directions, on which the channel detection process is performed, are all beam directions around the electronic equipment 200. Each beam direction includes multiple sub-beam directions. There is a beam, capable of transmitting information, in each sub-beam direction.

Figure 5:
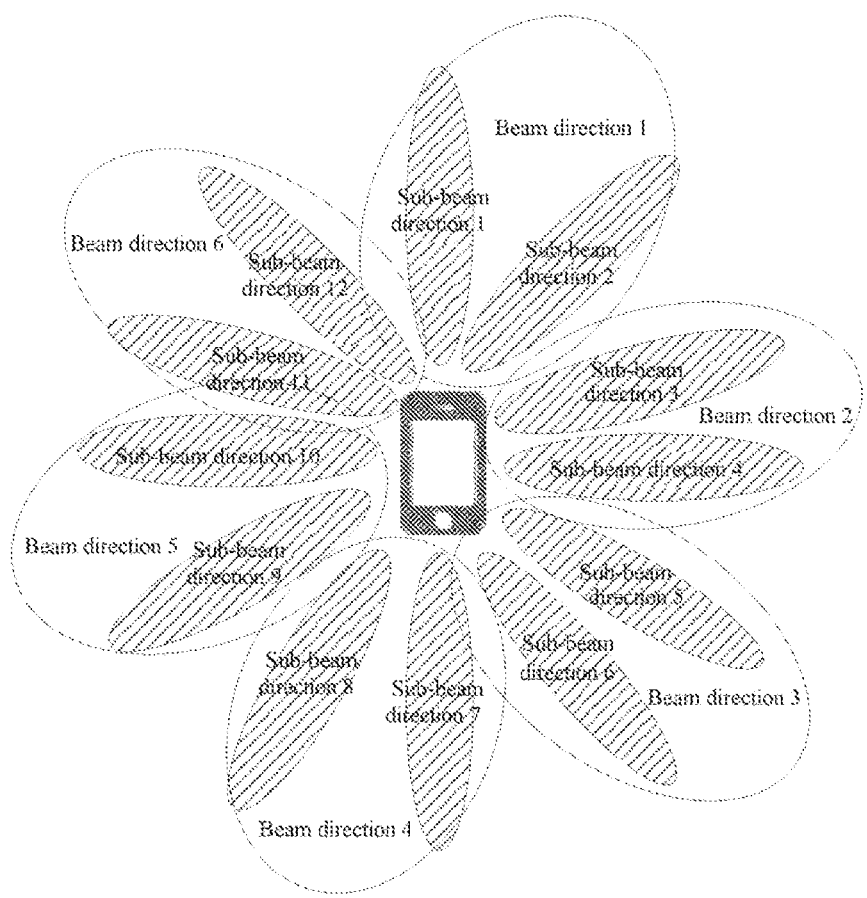
FIG. 5 is a schematic diagram of beam directions, on which a channel detection process is performed, according to another embodiment of the present disclosure.

FIG. 5 is a schematic diagram of beam directions, on which a channel detection process is performed, according to another embodiment of the present disclosure. As shown in FIG. 5, there are beam directions numbered 1 to 6 around the electronic equipment 200, and each beam direction includes two sub-beam directions. The processing circuit may perform the channel detection process on the beam directions numbered 1 to 6. Similarly, the processing circuit 210 may determine an order of the beam directions, on which the channel detection process is performed, according to a certain criteria. Assuming that the processing circuit 210 determines that the beam directions in which channel detection is idle are the beam direction numbered 2 and 3, the transceiver circuit 220 may transmit the random access preamble sequence in sub-beam direction 3, sub-beam direction 4, sub-beam direction 5 and sub-beam direction 6.

According to the above-described embodiment of the present disclosure, the electronic equipment 200 may perform the channel detection process only on the beam direction. Since the number of beam directions is less than the number of sub-beam directions, thereby reducing the number of times of the channel detection process to be performed, and saving the time for channel detection.

As described above, the electronic equipment 200 may perform the channel detection process according to any one of the above embodiments, or may combine the above embodiments according to a certain criteria.

According to an embodiment of the present disclosure, the electronic equipment 200 may preferably select a second manner. In the second manner, the beam directions, on which the channel detection process is to be performed, may be determined based on the received beam direction information. If an appropriate beam for transmitting uplink data is not determined, a third manner may be selected. In the third manner, multiple sub-beam directions are bound into one beam direction, so that the channel detection process is performed on the beam direction. If the appropriate beam for transmitting uplink data is still not determined, a first manner may be selected. In the first manner, the channel detection process is performed on all beams around the electronic equipment 200 in sequence.

The channel detection process performed by the electronic equipment 200 is described in detail above, and a transmission process of the random access preamble sequence will be described in detail below.

According to an embodiment of the present disclosure, the transceiver circuit 220 may transmit different random access preamble sequences for different beam directions. When the processing circuit 210 performs the channel detection process by using the third manner as described above, the transceiver circuit 220 transmits different random access preamble sequences for different beam directions. After the processing circuit 210 determines the beam direction or the sub-beam direction on which a random access preamble sequence is to be transmitted, the processing circuit 210 may allocate a random access preamble sequence for the beam direction or the sub-beam direction, so that different random access preamble sequences are transmitted for different beam directions or sub-beam directions. That is, the beam direction or the sub-beam direction may have a one-to-one correspondence with the random access preamble sequence.

According to an embodiment of the present disclosure, the transceiver circuit 220 may transmit the random access preamble sequence for the beam direction, one or more times, in each beam direction in which channel detection is idle. When the processing circuit 210 performs the channel detection process by using the third manner as described above, the transceiver circuit 220 transmits the random access preamble sequence for the beam direction, one or more times, in each beam direction in which channel detection is idle. After the processing circuit 210 determines the beam or sub-beam on which a random access preamble sequence is to be transmitted, the processing circuit 210 may allocate a random access preamble sequence for the beam direction or the sub-beam direction and may determine the number of times of the random access preamble sequence transmitted in each beam direction or sub-beam direction. According to an embodiment of the present disclosure, the random access preamble sequence may be transmitted one or more times in each beam direction or sub-beam direction.

According to an embodiment of the present disclosure, the processing circuit 210 may determine the number of times of the random access preamble sequence transmitted for the beam direction in each beam direction in which channel detection is idle, according to Maximum Channel Occupancy Time (MCOT). Similarly, when the processing circuit 210 performs the channel detection process by using the third manner as described above, the processing circuit 210 determines the number of times of the random access preamble sequence transmitted in each sub-beam direction in which channel detection is idle.

The processing circuit 210 may divide the duration of MCOT by a transmission duration of each random access preamble sequence, to determine the maximum number of times of the random access preamble sequence transmitted in each beam direction or sub-beam direction. For example, when MCOT is set to be 2 ms, the transmission duration of each random access preamble sequence is 1 ms, the processing circuit 210 can determine that the random access preamble sequence can be transmitted twice at most in each beam direction or sub-beam direction. Therefore, it may determined according to requirements to transmit the random access preamble sequence once or twice in each beam direction or sub-beam direction in which channel detection is idle.

According to an embodiment of the present disclosure, the random access preamble sequence may be transmitted once or more times in each beam direction or sub-beam direction in which channel detection is idle, thereby increasing the probability that the random access preamble sequence is successfully received.

According to an embodiment of the present disclosure, the processing circuit 210 may start a timer in the beginning of the channel detection process performed in the current beam direction, and start to perform the channel detection process on the next beam direction if the current beam direction is not detected to be idle before the timer expires.

According to an embodiment of the present disclosure, the channel detection process is performed on the beam directions in sequence, so it is necessary to set a timer for each beam direction. The timer durations for different beam directions may be the same or different. The processing circuit 210 may start a timer for a certain beam direction in the beginning of the channel detection process performed in the certain beam direction. The channel detection process may be performed on the certain beam direction one or more times before the timer expires. In a case that the certain beam direction is detected to be idle before the timer expires, the random access preamble sequence is transmitted in the certain beam direction which is detected to be idle, and it is started to perform the channel detection process on the next beam direction after the random access preamble sequence is transmitted. In a case that the certain beam direction is not detected to be idle before the timer expires, the processing circuit 210 starts to perform the channel detection process on the next beam direction of the certain beam direction.

Figure 6:
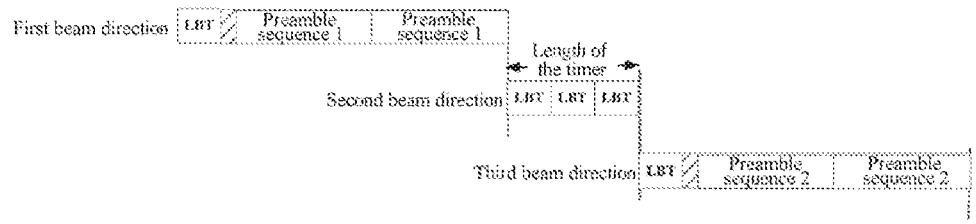
FIG. 6 is a schematic diagram of a process of transmitting a random access preamble sequence according to an embodiment of the present disclosure.

FIG. 6 is a schematic diagram of a process of transmitting a random access preamble sequence according to an embodiment of the present disclosure. As shown in FIG. 6, the electronic equipment 200 performs the channel detection process on a first beam direction, a second beam direction, and a third beam direction in the listed order. For the first beam direction, the electronic equipment 200 firstly starts a timer for the first beam direction, and then performs an LBT process. Assuming that the electronic equipment 200 determines that the first beam direction is idle before the timer expires, in this case, the electronic equipment transmits a random access preamble sequence for the first beam direction (such as the preamble sequence 1 shown in FIG. 6) in the first beam direction after a certain time interval has passed. After the random access preamble sequence for the first beam direction is transmitted, the electronic equipment 200 starts a timer for the second beam direction, and then performs an LBT process on the second beam direction. As shown in FIG. 6, after the LBT process are performed on the second beam direction three times, the timer expires and the second beam direction is still not detected to be idle. Next, the electronic equipment starts a timer for the third beam direction, and then performs an LBT process on the third beam direction. Assuming that the electronic equipment 200 determines that the third beam direction is idle before the timer expires, in this case, the electronic equipment transmits a random access preamble sequence for the third beam direction (such as the preamble sequence 2 shown in FIG. 6) in the third beam direction after a certain time interval has passed. It should be noted that FIG. 6 shows an example in which the random access preamble sequence is transmitted twice for each beam direction, apparently, the random access preamble sequence may be transmitted once or three or more times for each beam direction. Furthermore, FIG. 6 shows an example in which the channel detection process is performed on three beam directions, apparently, the electronic equipment 200 may perform the channel detection process on other numbers of beam directions.

According to an embodiment of the present disclosure, the random access preamble sequence transmitted by the electronic equipment 200 may be transmitted to a base station to which the electronic equipment 200 is to be randomly accessed, such as the base station of the secondary cell shown in FIG. 1(*a*), or the base station shown in FIG. 1(*b*). As described above, the electronic equipment 200 can perform a channel detection process based on beam directions, and transmit a random access preamble sequence in a beam direction in which channel detection is idle. In this way, the efficiency of channel detection can be improved and the delay caused by the channel detection process can be reduced. Further, a random access process on an unlicensed frequency band is implemented.

According to an embodiment of the present disclosure, the processing circuit 210 may start a random access response window for the transceiver circuit 220 to receive a random access response message.

According to an embodiment of the present disclosure, the random access response message received by the transceiver circuit 220 may be from a base station serving the electronic equipment including the transceiver circuit, such as the base station of the primary cell shown in FIG. 1(*a*) or the base station shown in FIG. 1(*b*).

According to an embodiment of the present disclosure, the processing circuit 210 may start the random access response window after the transceiver circuit 220 transmits the random access preamble sequence in all beam directions in which channel detection is idle.

According to an embodiment of the present disclosure, in a case that the random access response message is transmitted in an omnidirectional manner and the electronic equipment 200 includes only one set of transceiver, an operation of receiving data and an operation of transmitting data cannot be simultaneously performed, therefore the processing circuit 210 may start the random access response window only after all the random access preamble sequences are transmitted.

Figure 7:
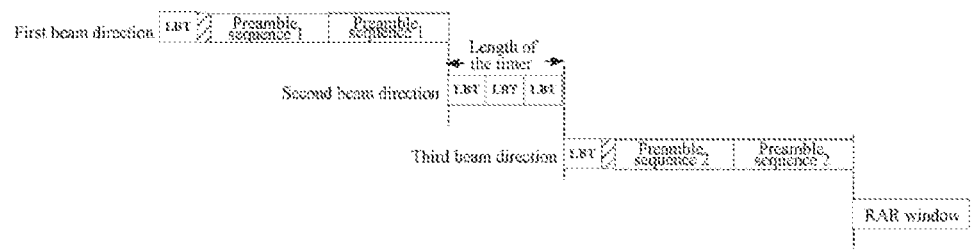
FIG. 7 is a schematic diagram of starting a random access response window according to an embodiment of the present disclosure.

FIG. 7 is a schematic diagram of starting a random access response window according to an embodiment of the present disclosure. As shown in FIG. 7, it is assumed that the electronic equipment 200 needs to perform the channel detection process on three beam directions and transmits the random access preamble sequence in a first beam direction and a third beam direction, in this case, the electronic equipment 200 starts the RAR (Random Access Response) window after the random access preamble sequence is transmitted in the third beam direction.

According to an embodiment of the present disclosure, the processing circuit 210 may start the random access response window after the transceiver circuit 220 transmits the random access preamble sequence for the first time in the first beam direction in which channel detection is idle.

According to an embodiment of the present disclosure, in a case that the random access response message is transmitted in an omnidirectional manner and the electronic equipment 200 includes multiple sets of transceiver, an operation of receiving data and an operation of transmitting data can be simultaneously performed. In addition, in a case that the random access response message is transmitted in a beam-based orientation manner and the transceiver of the electronic equipment can implement directional reception, an operation of receiving data and an operation of transmitting data can be simultaneously performed. In this case, the processing circuit 210 may start the random access response window after the random access preamble sequence is transmitted for the first time, to receive the random access response messages for the beam directions in which the random access preamble sequence is transmitted.

Figure 8:
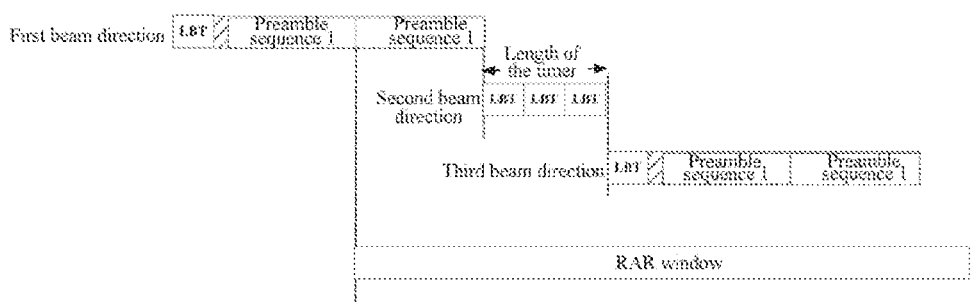
FIG. 8 is a schematic diagram of starting a random access response window according to another embodiment of the present disclosure.

FIG. 8 is a schematic diagram of starting a random access response window according to another embodiment of the present disclosure. As shown in FIG. 8, it is assumed that the electronic equipment 200 needs to perform the channel detection process on three beam directions and transmits the random access preamble sequence in a first beam direction and a third beam direction, the random access preamble sequence is transmitted twice on in each beam direction, in this case, the electronic equipment 200 starts the RAR window after the random access preamble sequence is transmitted for the first time in the first beam direction.

According to an embodiment of the present disclosure, the processing circuit 210 may start the random access response window for each beam direction in which channel detection is to idle after the transceiver circuit 220 transmits the random access preamble sequence for the first time in the beam direction.

According to an embodiment of the present disclosure, in a case that the random access response message is transmitted in an omnidirectional manner and the electronic equipment 200 includes multiple sets of transceiver, an operation of receiving data and an operation of transmitting data can be simultaneously performed. In addition, in a case that the random access response message is transmitted in a beam-based orientation manner and the transceiver of the electronic equipment can implement directional reception, an operation of receiving data and an operation of transmitting data can be simultaneously performed. In this case, the processing circuit 210 may start the random access response window for each beam direction or sub-beam direction after the random access preamble sequence is transmitted for the first time in the beam direction or sub-beam direction, to receive the random access response messages for the beam direction.

Figure 9:
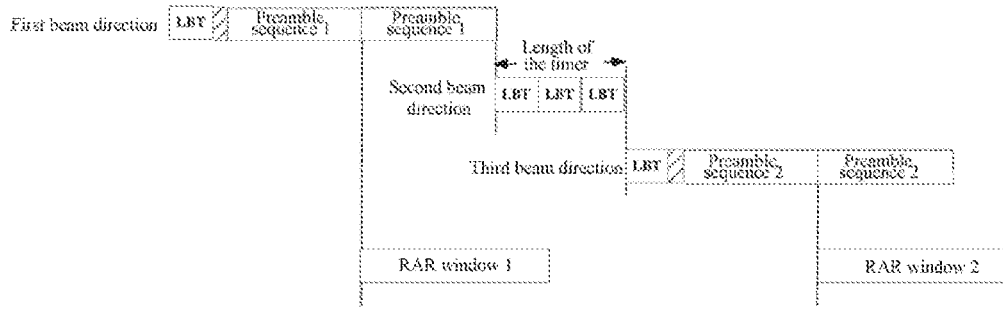
FIG. 9 is a schematic diagram of starting a random access response window according to another embodiment of the present disclosure.

FIG. 9 is a schematic diagram of starting a random access response window according to another embodiment of the present disclosure. As shown in FIG. 9, it is assumed that the electronic equipment 200 needs to perform the channel detection process on three beam directions and transmits the random access preamble sequence in a first beam direction and a third beam direction, the random access preamble sequence is transmitted twice on in each beam direction, in this case, the electronic equipment 200 starts a RAR window 1 for the first beam direction after the random access preamble sequence is transmitted for the first time in the first beam direction, and the electronic equipment 200 starts a RAR window 2 for the third beam direction after the random access preamble sequence is transmitted for the first time in the third beam direction.

According to an embodiment of the present disclosure, each RAR window may receive one or more random access response messages.

For example, in the examples shown in FIGS. 7 and 8, the electronic equipment 200 only starts one RAR window, so the RAR window may include one or more random access response messages. That is, the RAR window may be used to receive random access response messages for all beam directions or sub-beam directions in which the random access preamble sequence is transmitted. For example, when the electronic equipment 200 receives the random access response message for the first beam direction in the RAR window, it is indicated that the base station of the secondary cell as a receiving end receives the random access preamble sequence through the first beam direction, and informs the random access preamble sequence to the base station of the primary cell (the scenario in FIG. 1(a)), or it is indicated that the base station as a receiving end receives the random access preamble sequence through the first beam direction (the scenario in FIG. 1(b)). When the electronic equipment 200 receives the random access response message for the third beam direction in the RAR window, it is indicated that the receiving end receives the random access preamble sequence through the third beam direction. When the electronic equipment 200 receives the random access response messages for the first beam direction and the third beam direction in the RAR window, it is indicated that the receiving end receives the random access preamble sequences through the first beam direction and the third beam direction.

As another example, in the example shown in FIG. 9, the electronic equipment 200 starts one RAR window for each beam direction or sub-beam direction in which the random access preamble sequence is transmitted. Each RAR window may include one random access response message, the RAR window is used to receive a random access response message for the beam direction or sub-beam direction corresponding to the RAR window. When the electronic equipment 200 receives the random access response message for the first beam direction in RAR window 1, it is indicated that the receiving end receives the random access preamble sequence through the first beam direction. When the electronic equipment 200 receives the random access response message for the third beam direction in the RAR window 2, it is indicated that the receiving end receives the random access preamble sequence through the third beam direction.

As described above, the electronic equipment 200 may transmit a random access preamble sequence and receive a random access response message. This manner may be used for the random access process based on non-contention mode, that is, after the electronic equipment 200 receives the random access response message, the random access process ends, and the electronic equipment 200 may transmit uplink data. For example, this case applies to the scenario shown in FIG. 1(a).

According to an embodiment of the present disclosure, the processing circuit 210 may determine a beam direction or sub-beam direction of an unlicensed spectrum for transmitting uplink data, according to the received random access response message.

According to an embodiment of the present disclosure, the random access response message may include the random access preamble sequence received by the base station of the primary cell (the base station of the secondary cell may inform the random access preamble sequence to the base station of the primary cell after the base station of the secondary cell receives the random access preamble sequence, therefore, a case that the base station of the secondary cell receives the random access preamble sequence is equivalent to a case that the base station of the primary cell receives the random access preamble sequence). Further, the processing circuit 210 may determine the beam direction or sub-beam direction, in which the random access preamble sequence included in random access response message is transmitted, as the beam direction or sub-beam direction of the unlicensed spectrum for transmitting uplink data.

As described above, the electronic equipment 200 may transmit different random access preamble sequences for different beam directions or sub-beam directions. Therefore, if the electronic equipment 200 receives the random access response message, the electronic equipment may extract the random access preamble sequence from the random access response message, and determine the beam direction or sub-beam direction, in which the random access preamble sequence received by the base station of the primary cell based on the random access preamble sequence in the random access response message. Specifically, the processing circuit 210 may compare the random access preamble sequence extracted from the random access response message with the random access preamble sequences transmitted by the electronic equipment 200. In a case that the random access preamble sequence extracted from the random access response message is the same as one random access preamble sequence transmitted by the electronic equipment 200, it may be determined that the beam direction or sub-beam direction, in which the random access preamble sequence received by the base station of the primary cell is transmitted, is the beam direction or sub-beam direction in which the one random access preamble sequence is transmitted. For example, if the electronic equipment 200 transmits a preamble sequence 1 in a beam direction 1 and transmits a preamble sequence 2 in a beam direction 3, and the preamble sequence 2 is included in the random access response message received by the electronic equipment 200, in this case, the electronic equipment 200 may determine that the base station of the primary cell has received the preamble sequence 2 through the beam direction 3. Further, the electronic equipment 200 may determine the beam direction 3 as the beam direction or sub-beam direction of the unlicensed spectrum for transmitting the uplink data.

According to an embodiment of the present disclosure, after the processing circuit 210 determines the beam direction or sub-beam direction of the unlicensed spectrum for transmitting the uplink data, the uplink data may be transmitted to the base station of the secondary cell in the beam direction or sub-beam direction of the unlicensed spectrum.

Further, according to an embodiment of the present disclosure, the manner in which the electronic equipment 200 transmits a random access preamble sequence and receives a random access response message may be used for the random access process based on contention mode, that is, after the electronic equipment 200 receives the random access response message, the random access process does not end, and the electronic equipment 200 may transmit an uplink transmission message. The uplink transmission message includes but is not limited to an RRC (Radio Resource Control) connection request message. Apparently, the uplink transmission message may also include other messages than the RRC connection request message, which are not listed here. This case applies to the scenarios shown in FIG. 1(a) and FIG. 1(b).

According to an embodiment of the present disclosure, the processing circuit 210 may determine a beam direction of the unlicensed spectrum for transmitting an uplink transmission message according to the received random access response message. For example, the processing circuit 210 may determine the beam direction or sub-beam direction, in which the random access preamble sequence included in the random access response message is transmitted, as the beam direction or sub-beam direction of the unlicensed spectrum for transmitting the uplink transmission message. The method for determining the beam direction of the unlicensed spectrum for transmitting the uplink transmission message may be similar to the method for determining the beam direction of the unlicensed spectrum for transmitting the uplink data described above, which is not described herein. According to an embodiment of the present disclosure, after the processing circuit 210 determines the beam direction of the unlicensed spectrum for transmitting the uplink transmission message, the transceiver circuit 220 may transmit the uplink transmission message.

According to an embodiment of the present disclosure, the uplink transmission message such as the RRC connection request message may include identification information of the electronic equipment 200. The identification information includes but not limited to the RNTI (Radio Network Temporary Identity) of the electronic equipment 200.

According to an embodiment of the present disclosure, the transceiver circuit 220 may receive a transmission response message of the uplink transmission message. The transmission response message includes, but is not limited to, an RRC connection response message, the RRC connection response message includes identification information of the electronic equipment 200. Apparently, the transmission response message may also include other messages than the RRC connection response message, which are not listed here. When the transceiver circuit 220 receives the RRC connection response message including the identification information of the electronic equipment 20X), it is indicated that the electronic equipment 200 is allowed to access the base station of the secondary cell shown in FIG. 1(a) or the base station shown in FIG. 1(b).

According to an embodiment of the present disclosure, after the transceiver circuit 220 receives the transmission response message, the transceiver circuit 220 may further transmit uplink data and an access completion message by using a beam direction of the unlicensed spectrum for transmitting the uplink transmission message. The access completion message includes, but is not limited to, an RRC connection completion message. That is, the beam direction for transmitting the uplink transmission message by the transceiver circuit 220 is the same as the beam direction for transmitting the uplink data by the transceiver circuit 220. In other words, the processing circuit 210 determines the beam direction of the unlicensed spectrum for transmitting the uplink transmission message and the uplink data according to the received random access response message.

According to an embodiment of the present disclosure, in order to further save overhead, the electronic equipment 200 may include the uplink data in the uplink transmission message. That is, after the transmission response message is received, the access completion message is not transmitted, and the random access process ends.

According to an embodiment of the present disclosure, a random access process on an unlicensed frequency band is implemented. The random access process may be a random access process based on contention mode or a random access process based on non-contention mode. Furthermore, in the random access process based on contention mode, in a case that the uplink data to be transmitted by the electronic equipment 200 is relatively small, the uplink data may be included in the uplink transmission message to be transmitted together with the uplink transmission message, thereby reducing signaling overhead.

As described above, if the electronic equipment 200 receives the random access response message in the RAR window, the beam direction or the sub-beam direction for transmitting the uplink data (and the uplink transmission message) may be determined.

According to an embodiment of the present disclosure, the processing circuit 210 may re-perform the channel detection process on one or more beam directions in which channel detection is busy in a case that the electronic equipment 200 does not receive the random access response message in the RAR window.

According to an embodiment of the present disclosure, if the electronic equipment 200 does not receive the random access response message for any beam direction in the RAR window after the electronic equipment transmits a random access preamble sequence in beam directions in which channel detection is idle, it is indicated that the beam directions in which channel detection is idle may not be optimal transmission directions. For example, there are obstacles in the beam directions in which channel detection is idle, such that the transmitted random access preamble sequence is not received. In such a case, the beam directions in which channel detection is busy may be a more suitable transmission direction, so the processing circuit 210 may re-perform the channel detection process on the beam directions in which channel detection is busy.

According to an embodiment of the present disclosure, the processing circuit 210 may re-perform the channel detection process on all beam directions in which channel detection is busy. For example, in the example shown in FIGS. 6-9, since the second beam direction is a beam direction in which channel detection is busy, the processing circuit 210 may re-perform the channel detection process on the second beam direction. FIGS. 6-9 show an example in which there is only one beam direction in which channel detection is busy, according to an embodiment of the present disclosure, if there are multiple beam directions in which channel detection is busy, the processing circuit 210 may re-perform the channel detection process on each of the multiple beam directions.

According to an embodiment of the present disclosure, in the process of re-performing the channel detection process, the processing circuit 210 may extend the length of the timer set for each beam direction in which channel detection is busy until each beam direction is detected to be idle and to transmit the random access preamble sequence in each beam direction.

For each beam direction in which channel detection is busy, the processing circuit 210 may extend the length of the timer set for the beam direction. In this way, as long as a timer for a beam direction does not expire, the processing circuit 210 may always perform the LBT process on the beam direction until the beam direction is detected to be idle. Then the electronic equipment 200 may transmit the random access preamble sequence in the beam direction.

Furthermore, according to an embodiment of the present disclosure, the processing circuit 210 may improve the transmission power of the random access preamble sequence in each beam direction in which channel detection is busy.

According to an embodiment of the present disclosure, in a case that the electronic equipment 200 does not receive the random access response message, the channel detection process may be re-performed in beam directions in which channel detection is busy. Further, the electronic equipment 200 may extend the length of the timer set for each beam direction in which channel detection is busy, to transmit a random access preamble sequence in the beam direction. In addition, the electronic equipment 200 may improve the transmission power of the random access preamble sequence in the beam direction, to improve the probability that the transmitted random access preamble sequence is successfully received. In this way, the probability of finding a suitable beam direction for transmitting uplink data is improved.

According to an embodiment of the present disclosure, if the random access response message for one or more beam directions in which channel detection is busy is received in the RAR window after the processing circuit 210 re-performs the channel detection process on the beam directions in which channel detection is busy, it is indicated that the processing circuit 210 has found a suitable beam direction for transmitting the uplink data (and the uplink transmission message), and the beam direction may be used to transmit the uplink data (and the uplink transmission message).

According to an embodiment of the present disclosure, if no random access response message is received in the RAR window after the processing circuit 210 re-performs the channel detection process on the beam directions in which channel detection is busy, it is indicated that the processing circuit 210 does not find a suitable beam direction for transmitting the uplink data (and the uplink transmission message). In this case, if the beam directions in which the processing circuit 210 initially performs the channel detection process do not include all beam directions around the electronic equipment 200, the processing circuit 210 may attempt to perform the channel detection process on other beam directions in which the channel detection process is not performed.

For example, in a case that the processing circuit 210 performs the channel detection process by using the second manner described above, that is, the processing circuit 210 performs the channel detection process only in the beam directions includes in the received beam direction information, if the processing circuit 210 does not find a suitable beam direction for transmitting the uplink data (and the uplink transmission message), the processing circuit 210 may perform the channel detection process by using the third manner described above. That is, the processing circuit 210 performs the channel detection process on the beam direction including multiple sub-beam directions. If the processing circuit 210 still does not find a suitable beam direction for transmitting the uplink data (and the uplink transmission message), the processing circuit 210 may perform the channel detection process by using the first manner described above, that is, the processing circuit performs the channel detection process on all beam directions around the electronic equipment 200. Apparently, the above embodiments are merely illustrative and not limiting.

As described above, the electronic equipment 200 can perform a channel detection process based on beam directions, and transmit a random access preamble sequence in a beam direction in which channel detection is idle. In this way, the efficiency of channel detection can be improved and the delay caused by the channel detection process can be reduced. Further, a random access process on an unlicensed frequency band is implemented. Further, the electronic equipment 200 can receive the random access response message in the RAR window to determine a suitable beam direction for transmitting the uplink data (and the uplink transmission message). In addition, the electronic equipment 200 can also re-perform the channel detection process in the beam direction in which channel detection is busy, to improve the probability of finding the beam direction for transmitting the uplink data (and the uplink transmission message).

3. Second Embodiment

In this embodiment, an electronic equipment 1000 according to an embodiment of the present disclosure is described in detail. The electronic equipment 1000 may be a network side equipment in a wireless communication system, and specifically may be a network side equipment of a primary cell in the wireless communication system, such as the base station of the primary cell shown in FIG. 1(*a*). Furthermore, the wireless communication system including the electronic equipment 1000 may be an NR communication system.

Figure 10:
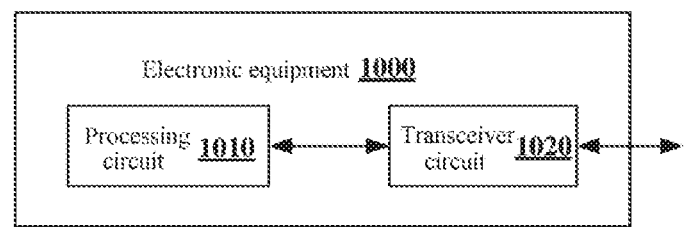
FIG. 10 is a block diagram showing a configuration example of an electronic equipment according to another embodiment of the present disclosure.

FIG. 10 is a block diagram showing a configuration example of an electronic equipment 1000 according to another embodiment of the present disclosure.

As shown in FIG. 10, the electronic equipment 1000 may include a processing circuit 1010 and a transceiver circuit 1020. It should be noted that the electronic equipment 1000 may include one processing circuit 1010 or multiple processing circuits 1010.

Further, the processing circuit 1010 may include various discrete functional units to perform various different functions and/or operations. It should be noted that the functional units may be physical entities or logical entities, and units referred to as different names may be implemented by a same physical entity.

According to an embodiment of the present disclosure, the processing circuit 1010 may determine one or more optimized transmitting beam directions of terminal equipment within the coverage area of the electronic equipment 1000.

According to an embodiment of the present disclosure, the transceiver circuit 1020 may transmit, to the terminal equipment, beam direction information including the one or more optimized transmitting beam directions.

As described above, the electronic equipment 1000 may the transmit beam direction information to the terminal equipment, so that the terminal equipment performs a channel detection process on beam directions included in the beam direction information, and transmits a random access preamble sequence. In this way, the number of times of the channel detection process to be performed by the terminal equipment is reduced, the efficiency of channel detection can be improved and the delay caused by the channel detection process can be reduced. Further, a random access process on an unlicensed frequency band is implemented.

According to an embodiment of the present disclosure, the processing circuit 1010 may determine one or more optimized transmitting beam directions of the terminal equipment based on at least location information of the terminal equipment and location information of a base station of a secondary cell where the terminal equipment is located. Since the terminal equipment and the base station of the secondary cell are all located within the coverage area of the electronic equipment 1000, the electronic equipment 1000 knows related information of the terminal equipment and the base station of the secondary cell, the related information includes the location information, so that the processing circuit can estimate the optimized transmitting beam directions of the terminal equipment. These transmitting beam directions are used by the terminal equipment to transmit a random access preamble sequence to the base station of the secondary cell.

According to an embodiment of the present disclosure, the transceiver circuit 1020 may transmit, to the terminal equipment, the beam direction information by using a PDCCH (Physical Downlink Control Channel) when the random access process is triggered. The electronic equipment 1000 may determine the timing at which the random access process needs to be triggered, and the random access process is used to randomly access the terminal equipment to the base station of the secondary cell. Further, the electronic equipment 1000 may transmit trigger information to the terminal equipment by using the PDCCH, the trigger information includes the beam direction information.

According to an embodiment of the present disclosure, the beam direction information transmitted to the terminal equipment may further include a preference order of the one or more optimized transmitting beam directions.

According to an embodiment of the present disclosure, the transceiver circuit 1020 may transmit a random access response message to the terminal equipment, the random access response message includes a random access preamble sequence received by the transceiver circuit 1020.

According to an embodiment of the present disclosure, the transceiver circuit 1020 may acquire a random access preamble sequence received by the base station of the secondary cell from the base station of the secondary cell, and transmit the random access response message including the received random access preamble sequence to the terminal equipment, so that the terminal equipment selects a beam direction for transmitting uplink data to the base station of the secondary cell based on the random access response message.

Figure 11:
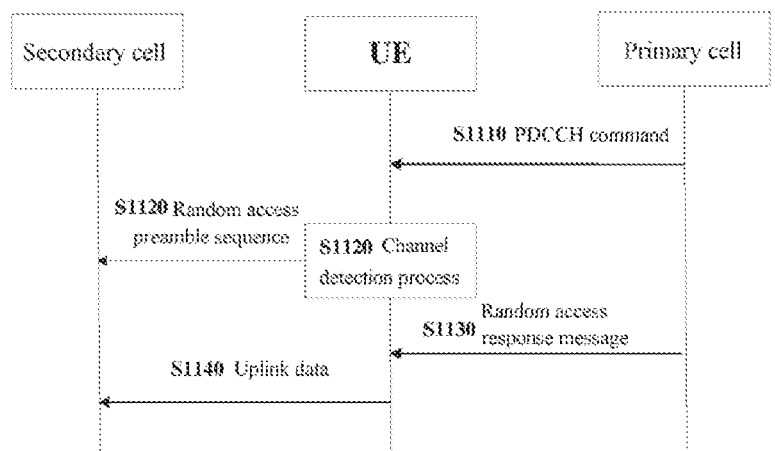
FIG. 11 is a signaling flow diagram of a random access process according to an embodiment of the present disclosure.

FIG. 11 is a signaling flow diagram of a random access process according to an embodiment of the present disclosure. The signaling flow diagram shown in FIG. 11 is applicable to the scenario shown in FIG. 1(a). As shown in FIG. 11, in step S1110, a base station of a primary cell determines that a random access process between a UE and a base station of a secondary cell needs to be triggered, then the base station of the primary cell transmits a PDCCH command to the UE. Optionally, the PDCCH command may include beam direction information of the UE. Next, in step S1120, the UE performs a channel detection process and transmits a random access preamble sequence to the base station of the secondary cell in the beam direction in which channel detection is idle. Next, in step S1130, the base station of the primary cell transmits a random access response message to the UE, and the UE may receive the random access response message in the RAR window. Next, in step S1140, the UE transmits uplink data to the base station of the secondary cell by using the determined beam direction for transmitting the uplink data. Here, if the appropriate beam direction for transmitting the uplink data is not found in steps S1120 and S1130, the UE may re-perform the channel detection process in the beam direction in which channel detection is busy until the beam direction for transmitting the uplink data is found. In the steps shown in FIG. 11, information is received from the base station of the primary cell in steps S1110 and S1130 through licensed spectrum, and information is transmitted to the base station of the secondary cell in steps S1120 and S1140 through unlicensed spectrum. As shown in FIG. 11, the UE successfully accesses the base station of the secondary cell and transmits uplink data to the base station of the secondary cell by using the unlicensed spectrum. FIG. 11 only shows a random access process based on a non-contention mode. When a random access process based on a contention mode is used, the UE may also transmit an uplink transmission message and receive a transmission response message after step S1130 and before step S1140.

According to an embodiment of the present disclosure, the electronic equipment 1000 may provide a service for the electronic equipment 200 within the coverage area of the electronic equipment 1000, and all embodiments related to the electronic equipment 200 in the first embodiment are applicable thereto.

4. Third Embodiment

In this embodiment, an electronic equipment 1200 according to an embodiment of the present disclosure is described in detail. The electronic equipment 1200 may be a network side equipment in a wireless communication system, such as the base station shown in FIG. 1(b). Furthermore, the wireless communication system including the electronic equipment 1200 may be an NR communication system.

Figure 12:
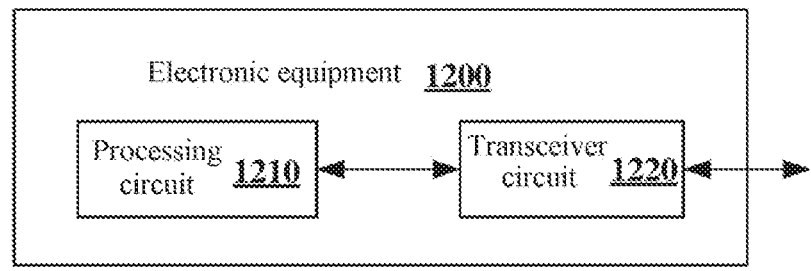
FIG. 12 is a block diagram showing a configuration example of an electronic equipment according to another embodiment of the present disclosure.

FIG. 12 is a block diagram showing a configuration example of an electronic equipment 1200 according to another embodiment of the present disclosure.

As shown in FIG. 12, the electronic equipment 1200 may include a processing circuit 1210 and a transceiver circuit 1220. It should be noted that the electronic equipment 1200 may include one processing circuit 1210 or multiple processing circuits 1210.

Further, the processing circuit 1210 may include various discrete functional units to perform various different functions and/or operations. It should be noted that the functional units may be physical entities or logical entities, and units referred to as different names may be implemented by a same physical entity.

According to an embodiment of the present disclosure, the processing circuit 1210 may perform a channel detection process on one or more beam directions of an unlicensed spectrum.

The processing circuit 1210 may perform the channel detection process by using any method known in the art. For example, the processing circuit 1210 may perform an LBT process, to check whether a channel is idle by means of Clear Channel Assessment. According to an embodiment of the present disclosure, the processing circuit 1210 may perform the channel detection process on each of the one or more beam directions. That is, the processing circuit 1210 may perform the channel detection process on a specific beam direction. That is, the processing circuit 1210 may perform a listening operation on the specific beam direction to determine whether the specific beam direction is idle. In a case that the specific beam direction is idle, it is indicated that no equipment is transmitting data in the particular beam direction, or interference caused by the equipment transmitting data in the particular beam direction is within a predetermined range, in this case, the electronic equipment 1200 can use the particular beam direction.

According to an embodiment of the present disclosure, the transceiver circuit 1220 may transmit a random access response message in one or more beam directions in which channel detection is idle, the random access response message includes a random access preamble sequence received by the transceiver circuit 1220.

As can be seen, according to an embodiment of the present disclosure, the electronic equipment can perform a channel detection process based on beam directions, and transmit a random access response message in a beam direction in which channel detection is idle. That is, the random access response message is transmitted in a beam-based orientation manner. In this way, the efficiency of channel detection can be improved and the delay caused by the channel detection process can be reduced. Further, a random access process on an unlicensed frequency band is implemented.

According to an embodiment of the present disclosure, the processing circuit 1210 may determine one or more optimized transmitting beam directions of terminal equipment within the coverage area of the electronic equipment

1200. According to an embodiment of the present disclosure, the transceiver circuit 1220 may transmit, to the terminal equipment, beam direction information including the one or more optimized transmitting beam directions.

As described above, the electronic equipment 1200 may transmit beam direction information to the terminal equipment, so that the terminal equipment performs a channel detection process on beam directions included in the beam direction information, and transmits a random access preamble sequence. In this way, the number of times of the channel detection process to be performed by the terminal equipment is reduced, the efficiency of channel detection can be improved and the delay caused by the channel detection process can be reduced. Further, a random access process on an unlicensed frequency band is implemented.

According to an embodiment of the present disclosure, the processing circuit 1210 may determine one or more optimized transmitting beam directions of the terminal equipment based on at least location information of the terminal equipment. Since the terminal equipment is located within the coverage area of the electronic equipment 1200, the electronic equipment 1200 knows related information of the terminal equipment, the related information includes the location information, so that the processing circuit can estimate the optimized transmitting beam directions of the terminal equipment. These transmitting beam directions are used by the terminal equipment to transmit a random access preamble sequence to the electronic equipment 1200.

According to an embodiment of the present disclosure, the transceiver circuit 1220 may receive a random access preamble sequence, and the processing circuit 1210 may perform the channel detection process on one or more beam directions of unlicensed spectrum in response to a case that the transceiver circuit receives the random access preamble sequence. The random access preamble sequence received by the transceiver circuit 1220 may be transmitted by the terminal equipment within the coverage area of the electronic equipment 1200. Further, the random access response message transmitted by the electronic equipment 1200 includes the random access preamble sequence received by the electronic equipment 1200.

According to an embodiment of the present disclosure, an example in which the processing circuit 1210 performs the channel detection process may be similar to an example in which the processing circuit 210 of the electronic equipment 200 performs the channel detection process. For example, the processing circuit 1210 may perform the channel detection process on the one or more beam directions in sequence. The processing circuit 1210 may determine an order of the beam directions, on which the channel detection process is performed, according to a certain criteria.

According to an embodiment of the present disclosure, the processing circuit 1210 may perform the channel detection process on each of all beam directions formed by the electronic equipment 1200. That is, the one or more beam directions, on which the channel detection process is performed, are all beam directions formed by the electronic equipment 1200. There is a beam, capable of transmitting a random access response message or other information, in each beam direction.

According to an embodiment of the present disclosure, the processing circuit 1210 may determine one or more optimized transmitting beams of the electronic equipment 1200. Further, the processing circuit 1210 may also determine a preference order of the one or more optimized transmitting beams. Since the electronic equipment 1200 provides a service for the terminal equipment within the coverage area of the electronic equipment 1200, the electronic equipment 1200 can know all relevant information of the terminal equipment, and can determine information about optimal transmitting beams of the electronic equipment 1200 for transmitting the random access response message. According to an embodiment of the present disclosure, one or more beam directions in which the channel detection process is performed refer to all optimized transmitting beams determined by electronic equipment 1200. Further, the processing circuit 1210 may perform the channel detection process on one or more beam directions according to the determined preference order. According to the above-described embodiment of the present disclosure, the electronic equipment 1200 may perform the channel detection process only on the optimized beam directions, thereby narrowing the range of beam directions in which the channel detection process is to be performed, and saving the time for channel detection.

According to an embodiment of the present disclosure, each of the one or more beam directions on which the channel detection process is performed may include multiple sub-beam directions. There is a beam, capable of transmitting a random access response message or other information, in each sub-beam direction. That is, the processing circuit 1210 may combine multiple sub-beams into one beam. The number of sub-beams included in each beam may be the same or different. According to an embodiment of the present disclosure, the processing circuit 1210 may perform the channel detection process on each beam. If a channel detection result of the beam is idle, it means that all the sub-beams included in the beam are idle, in this case, the electronic equipment 1200 may use all the sub-beams in the beam to transmit the random access response message. That is, in the above embodiment, the one or more beam directions, on which the channel detection process is performed, are all beam directions around the electronic equipment 1200. Each beam direction includes multiple sub-beam directions. There is a beam, capable of transmitting information, in each sub-beam direction. According to the above-described embodiment of the present disclosure, the electronic equipment 1200 may perform the channel detection process only on the beam direction. Since the number of beam directions is less than the number of sub-beam directions, thereby reducing the number of times of the channel detection process to be performed, and saving the time for channel detection.

As described above, the electronic equipment 1200 may perform the channel detection process according to any one of the above embodiments, or may combine the above embodiments according to a certain criteria.

According to an embodiment of the present disclosure, the transceiver circuit 1220 may receive an uplink transmission message from the terminal equipment within the coverage area of the electronic equipment 1200. The uplink transmission message includes, but is not limited to, an RRC connection request message, the RRC connection request message includes identification information of the terminal equipment.

According to an embodiment of the present disclosure, the transceiver circuit 1220 may transmit a transmission response message to terminal equipment being allowed to access the electronic equipment 1200. The transmission response message includes, but is not limited to, an RRC connection response message, the transmission response message such as the RRC connection response message may include identification information of the terminal equipment being allowed to access the electronic equipment 1200.

According to an embodiment of the present disclosure, the beam direction in which the transceiver circuit 1220 transmits the transmission response message may be the same as the beam direction in which the random access response message is transmitted. That is, the transmission response message is transmitted in a beam-based orientation manner. Further, the processing circuit 1210 may reserve the unlicensed spectrum used in transmission of the random access response message for transmitting the uplink transmission message by the terminal equipment within the coverage area of the electronic equipment 1200; and transmitting, by the electronic equipment 1200, the transmission response message of the uplink transmission message to the terminal equipment being allowed to access the electronic equipment 1200. That is, the unlicensed spectrum resource used by the electronic equipment 1200 to transmit the random access response message, the unlicensed spectrum resource used by the terminal equipment to transmit the uplink transmission message, and the unlicensed spectrum resource used by the electronic equipment 1200 to transmit the transmission response message are the same. This can be implemented by the electronic equipment 1200 reasonably setting a value of the MCOT (Max Channel Occupy Time) when the random access response message is started to be transmitted. For example, the MCOT is set to be 80 ms, so that an operation that the electronic equipment 1200 transmits the random access response message, an operation that the terminal equipment transmits the uplink transmission message, and an operation that the electronic equipment 1200 transmits the transmission response message are all completed within the scope of the MCOT According to an embodiment of the present disclosure, the electronic equipment 1200 may determine whether to allow the terminal equipment that transmits the uplink transmission message to access the electronic equipment 1200 in response to reception of the uplink transmission message. And the electronic equipment 1200 transmits the transmission response message to the terminal equipment being allowed to access the electronic equipment 1200.

According to an embodiment of the present disclosure, the electronic equipment 1200 may further receive an access completion message and uplink data from the terminal equipment. The access completion message includes, but is not limited to, an RRC connection completion message. The electronic equipment 1200 may receive the access completion message and the uplink data after transmitting the transmission response message. In this case, the unlicensed spectrum, which is reserved by the electronic equipment 1200) and is used in transmission of the random access response message, may also be used by the terminal equipment to transmit the access completion message and the uplink data. That is, an operation that the terminal equipment transmits the access completion message and the uplink data also needs to be completed within the scope of the MCOT In addition, the electronic equipment 1200 may also receive the uplink data while receiving the uplink transmission message.

Figure 13:
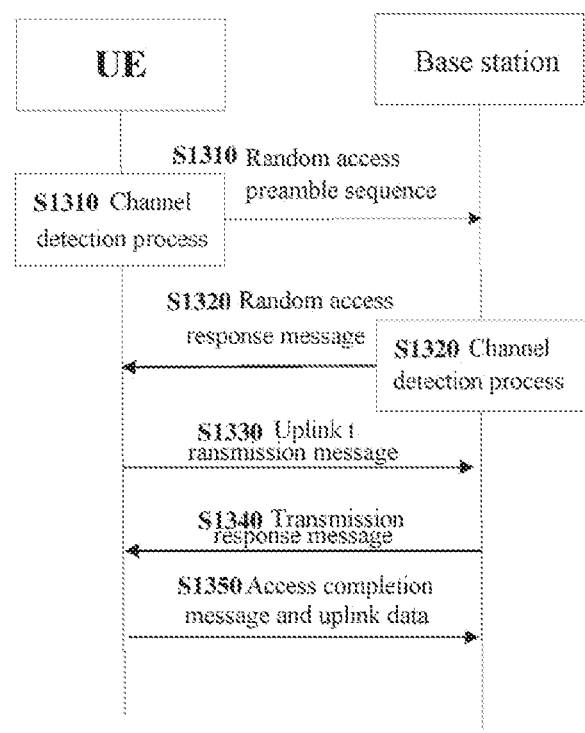
FIG. 13 is a signaling flow diagram of a random access process according to another embodiment of the present disclosure.

FIG. 13 is a signaling flow diagram of a random access process according to another embodiment of the present disclosure. The signaling flow diagram shown in FIG. 13 is applicable to the scenario shown in FIG. 1(*b*). As shown in FIG. 13, in step S1310, a UE performs a channel detection process and transmits a random access preamble sequence to a base station in a beam direction in which channel detection is idle. The UE may transmit the random access preamble sequence to the base station by using any one manner in the first embodiments. Next, in step S1320, the base station performs a channel detection process and transmits a random access response message to the UE in a beam direction in which channel detection is idle. Next, in step S1330, the UE sends an uplink transmission message to the base station, the uplink transmission message may include identification information of the UE. Next, in step S1340, the base station transmits a transmission response message to the UE. It is assumed that the base station allows the UE to access the base station, and therefore the transmission response message includes the identification information of the UE. Further, the beam in which the base station transmits the transmission response message in step S1340 is the same as the beam in which the base station transmits the random access response message in step S1320. Next, in step S1350, the UE transmits an access completion message and uplink data to the base station. The beam in which the UE transmits the uplink transmission message in step S1330 is the same as the beam in which the UE transmits the access completion message and the uplink data in step S1350. In addition, the base station reserves the unlicensed spectrum resource for transmitting the random access response message when starting to transmit the random access response message, so that the unlicensed spectrum resource used in steps S1320, S1330, S1340 and S1350 is the same and operations of these steps are completed within the scope of the MCOT. As shown in FIG. 13, the UE successfully accesses the base station and transmits uplink data to the base station by using an unlicensed spectrum.

Figure 14:
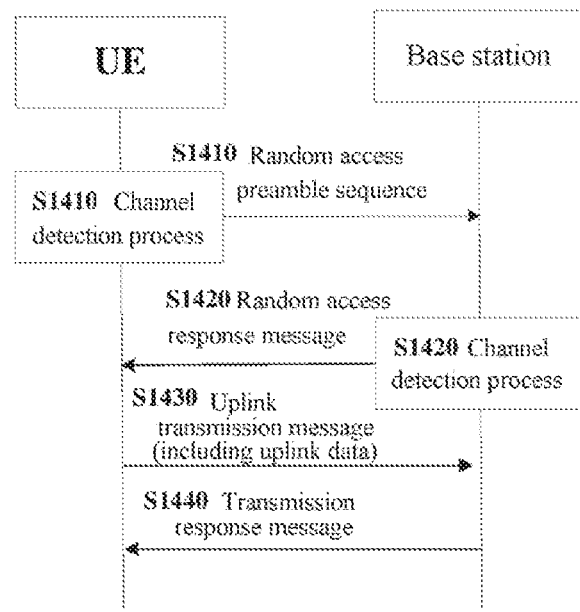
FIG. 14 is a signaling flow diagram of a random access process according to another embodiment of the present disclosure.

FIG. 14 is a signaling flow diagram of a random access process according to another embodiment of the present disclosure. The signaling flow diagram shown in FIG. 14 is applicable to the scenario shown in FIG. 1(*b*). As shown in FIG. 14, in step S1410, a UE performs a channel detection process and transmits a random access preamble sequence to a base station in a beam direction in which channel detection is idle. The UE may transmit the random access preamble sequence to the base station by using any one manner in the first embodiments. Next, in step S1420, the base station performs a channel detection process and transmits a random access response message to the UE in a beam direction in which channel detection is idle. Next, in step S1430, the UE sends an uplink transmission message to the base station, the uplink transmission message may include identification information of the UE. Further, the RRC connection request message further includes uplink data. Next, in step S1440, the base station transmits a transmission response message to the UE. It is assumed that the base station allows the UE to access the base station, and therefore the transmission response message includes the identification information of the UE. Further, the beam in which the base station transmits the transmission response message in step S1440 is the same as the beam in which the base station transmits the random access response message in step S1420. In addition, the base station reserves the unlicensed spectrum resource for transmitting the random access response message when starting to transmit the random access response message, so that the unlicensed spectrum resource used in steps S1420, S1430 and S1440 is the same and operations of these steps are completed within the scope of the MCOT As shown in FIG. 14, the UE successfully accesses the base station and transmits uplink data to the base station by using an unlicensed spectrum. In addition, in the signaling flow diagram shown in FIG. 14, a step of transmitting an access completion message is omitted, which can effectively save signaling.

According to an embodiment of the present disclosure, the electronic equipment 1200 may provide a service for the electronic equipment 200 within the coverage area of the electronic equipment 1200, and all embodiments related to the electronic equipment 200 in the first embodiment are applicable thereto.

It should be noted that the scenario shown in FIG. 1(*b*) is also applicable to the case in which CA (Carrier Aggregation) is used. The scenario shown in FIG. 1(*b*) applied to a case of CA is similar to the scenario shown in FIG. 1(*a*), that is, the communication system includes a primary cell and a secondary cell. Different from the scenario shown in FIG. 1(*a*), in the scenario shown in FIG. 1(*b*) applied to a case of CA, both the communication between the UE and the primary cell and the communication between the UE and the secondary cell are implemented by using an unlicensed frequency band. In this case, the random access process between the UE and the base station of the secondary cell may be implemented by using any of the manners described in the foregoing embodiments. Further, in a CA scenario using only an unlicensed frequency band, the random access process between the UE and the secondary cell may be implemented as follows.

(1) The random access between the UE and the secondary cell is completed by the primary cell. Taking the manner shown in FIGS. 13-14 as an example, the steps S1310-S1340 (S1410-1440) are performed by the UE and the base station of the primary cell in an unlicensed frequency band;

(2) The random access between the UE and the secondary cell is completed by the primary cell and the secondary cell. Taking the manner shown in FIGS. 13-14 as an example, the steps S1310-S1330 (S1410-1430) are performed by the UE and the base station of the primary cell in an unlicensed frequency band in which the UE communicates with the base station of the primary cell, and the message of the step S1340 (S1440) is transmitted by the base station of the secondary cell to the UE in an unlicensed frequency band in which the base station of the secondary cell communicates with the UE; or (3) The random access between the UE and the secondary cell is completed by the secondary cell. Taking the manner shown in FIGS. 13-14 as an example, the steps S1310-S1340 (S1410-1440) are performed by the UE and the base station of the secondary cell in an unlicensed frequency band.

5. Fourth Embodiment

Next, a wireless communication method executed by an electronic equipment 200 in a wireless communication system according to the present disclosure is described in detail. The electronic equipment may be a terminal equipment in the wireless communication system, and thus all embodiments of the electronic equipment 200 in the first embodiment are applicable in this embodiment.

Figure 15:
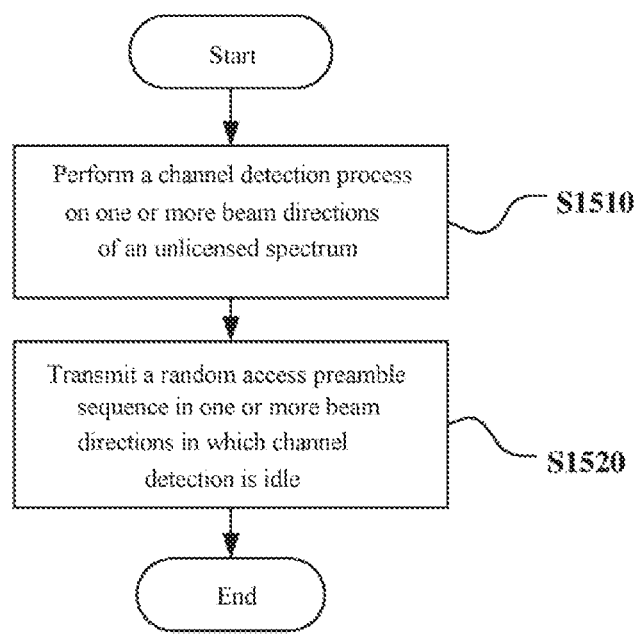
FIG. 15 is a flowchart of a wireless communication method executed by electronic equipment according to an embodiment of the present disclosure.

FIG. 15 is a flowchart of a wireless communication method executed by the electronic equipment 200 according to an embodiment of the present disclosure.

As shown in FIG. 15, in step S1510, a channel detection process is performed on one or more beam directions of an unlicensed spectrum.

Next, in step S1520, a random access preamble sequence is transmitted in one or more beam directions in which channel detection is idle.

Preferably, the method further includes: receiving beam direction information, and performing a channel detection process includes: performing the channel detection process on one or more beam directions included in the beam direction information in sequence.

Preferably, each beam direction of the unlicensed spectrum includes multiple sub-beam directions, and transmitting the random access preamble sequence includes: transmitting the random access preamble sequence in the multiple sub-beam directions included in each beam direction in which channel detection is idle.

Preferably, transmitting the random access preamble sequence includes: transmitting different random access preamble sequences for different beam directions.

Preferably, transmitting the random access preamble sequence includes: transmitting the random access preamble sequence for the beam direction, one or more times, in each beam direction in which channel detection is idle.

Preferably, the method further includes: determining the number of times of the random access preamble sequence transmitted for the beam direction in each beam direction in which channel detection is idle, according to Maximum Channel Occupancy Time (MCOT).

Preferably, the method further includes: starting a timer in the beginning of the channel detection process performed in the current beam direction, and starting to perform the channel detection process on the next beam direction if the current beam direction is not detected to be idle before the timer expires.

Preferably, the method further includes: starting a random access response window to receive a random access response message.

Preferably, starting a random access response window includes: starting the random access response window after the random access preamble sequence is transmitted in all beam directions in which channel detection is idle.

Preferably, starting a random access response window includes: starting the random access response window after the random access preamble sequence is transmitted for the first time in the first beam direction in which channel detection is idle.

Preferably, starting a random access response window includes: starting the random access response window for each beam direction in which channel detection is idle after the random access preamble sequence is transmitted for the first time in the beam direction.

Preferably, the method further includes: determining a beam direction of an unlicensed spectrum for transmitting uplink data, according to the received random access response message.

Preferably, the method further includes: re-performing the channel detection process on one or more beam directions in which channel detection is busy in case of not receiving the random access response message.

Preferably, re-performing the channel detection process includes: extending the length of the timer set for each beam direction in which channel detection is busy until each beam direction is detected to be idle and to transmit the random access preamble sequence in each beam direction.

Preferably, re-performing the channel detection process includes: improving the transmission power of the random access preamble sequence in each beam direction.

Preferably, the method further includes: determining a beam direction of the unlicensed spectrum for transmitting an uplink transmission message according to the received random access response message, and transmitting the uplink transmission message.

Preferably, the uplink transmission message includes a Radio Resource Control (RRC) connection request message, the RRC connection request message includes identification information of the electronic equipment.

Preferably, the RRC connection request message further includes uplink data.

Preferably, the method further includes: receiving a transmission response message of the uplink transmission message.

Preferably, the transmission response message includes a Radio Resource Control (RRC) connection response message, the RRC connection response message includes identification information of the electronic equipment.

Preferably, the wireless communication system is a New Wireless (NR) communication system, and the electronic equipment is a terminal equipment.

The wireless communication method executed by the electronic equipment 200 according to the embodiment of the present disclosure has been described in detail in the first embodiment, and details thereof are not described herein again.

6. Fifth Embodiment

Next, a wireless communication method executed by an electronic equipment 1000 in a wireless communication system according to the present disclosure is described in detail. The electronic equipment may be a network side equipment in the wireless communication system, and thus all embodiments of the electronic equipment 1000 in the second embodiment are applicable in this embodiment.

Figure 16:
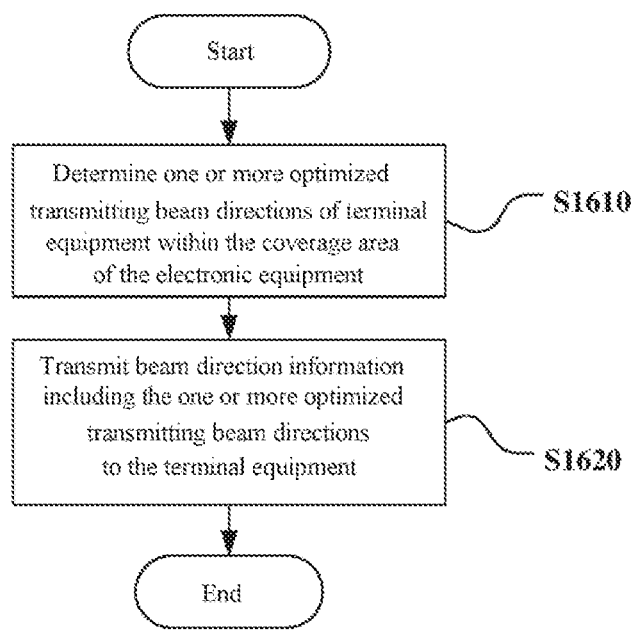
FIG. 16 is a flowchart of a wireless communication method executed by electronic equipment according to another embodiment of the present disclosure.

FIG. 16 is a flowchart of a wireless communication method executed by the electronic equipment 1000 according to an embodiment of the present disclosure.

As shown in FIG. 16, in step S1610, it is determined one or more optimized transmitting beam directions of terminal equipment within the coverage area of the electronic equipment.

Next, in step S1620, beam direction information including the one or more optimized transmitting beam directions is transmitted to the terminal equipment.

Preferably, the method further includes: transmitting a random access response message to the terminal equipment, the random access response message includes a random access preamble sequence received by the electronic equipment 1000.

Preferably, the wireless communication system is a New Wireless (NR) communication system, and the electronic equipment is a network side equipment.

The wireless communication method executed by the electronic equipment 1000 according to the embodiment of the present disclosure has been described in detail in the second embodiment, and details thereof are not described herein again.

7. Sixth Embodiment

Next, a wireless communication method executed by an electronic equipment 1200 in a wireless communication system according to the present disclosure is described in detail. The electronic equipment may be a network side equipment in the wireless communication system, and thus all embodiments of the electronic equipment 1200 in the third embodiment are applicable in this embodiment.

Figure 17:
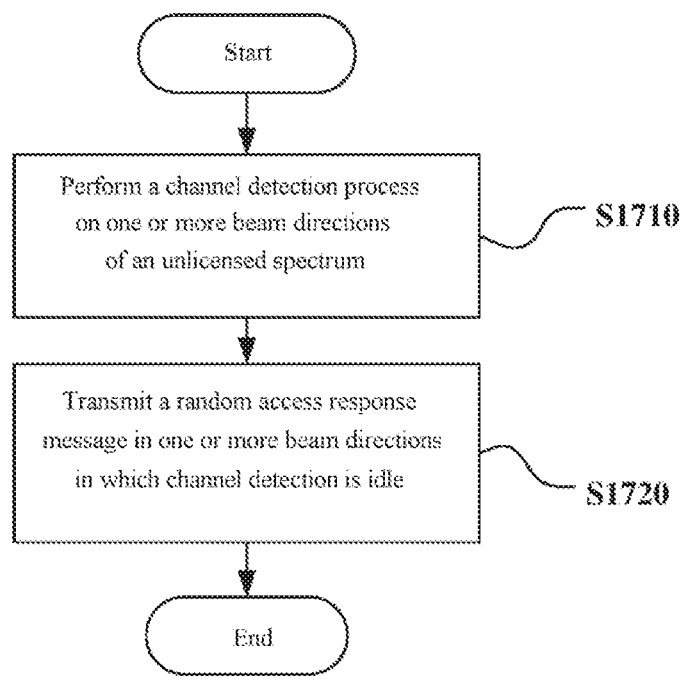
FIG. 17 is a flowchart of a wireless communication method executed by electronic equipment according to another embodiment of the present disclosure.

FIG. 17 is a flowchart of a wireless communication method executed by the electronic equipment 1200 according to an embodiment of the present disclosure.

As shown in FIG. 17, in step S1710, a channel detection process is performed on one or more beam directions of an unlicensed spectrum.

Next, in step S1720, a random access response message is transmitted in one or more beam directions in which channel detection is idle, the random access response message includes a random access preamble sequence received by the electronic equipment 1200.

Preferably, the method further includes: receiving an uplink transmission message from terminal equipment within the coverage area of the electronic equipment 1200.

Preferably, the uplink transmission message includes a Radio Resource Control (RRC) connection request message, the RRC connection request message includes identification information of the terminal equipment.

Preferably, the RRC connection request message further includes uplink data.

Preferably, the method further includes: transmitting a transmission response message of the uplink transmission message to terminal equipment being allowed to access the electronic equipment 1200.

Preferably, the transmission response message includes a Radio Resource Control (RRC) connection response message, the RRC connection response message including identification information of the terminal equipment being allowed to access the electronic equipment 1200.

Preferably, the method further includes: reserving the unlicensed spectrum used in transmission of the random access response message for transmitting the uplink transmission message by the terminal equipment within the coverage area of the electronic equipment 1200; and transmitting, by the electronic equipment 1200, the transmission response message of the uplink transmission message to the terminal equipment being allowed to access the electronic equipment 1200.

Preferably, the wireless communication system is a New Wireless (NR) communication system, and the electronic equipment 1200 is a network side equipment.

8. Application Example

The technology of the present disclosure may be applied to various products. For example, the network side equipment may be realized as a base station, the base station may be implemented as any type of eNB, such as a macro eNB and a small eNB. Further, the base station may be implemented as any type of gNB. Further, the small eNB may be an eNB covering a cell smaller than a macro cell, such as a pico eNB, a micro eNB and a home (femto) eNB. Alternatively, the base station may be implemented as any other type of base stations, such as a NodeB and a base transceiver station (BTS). The base station may include: a main body (which is also referred to as a base station device) configured to control wireless communication; and one or more remote radio heads (RRH) located at positions different from the main body. In addition, various types of terminals described below each may operate as a base station by temporarily or semi-persistently performing functions of the base station.

The terminal equipment may be implemented as a mobile terminal (such as a smart phone, a tablet personal computer (PC), a notebook PC, a portable game terminal, a portable/dongle mobile router and a digital camera) or an in-vehicle terminal (such as a car navigation device). In particular, a terminal equipment as a remote device may be implemented as a wearable device, and a terminal equipment as a relay device may be implemented as a mobile terminal that is very close to the wearable device. The terminal equipment may also be implemented as a terminal (which is also referred to as a machine type communication (MTC) terminal) that performs machine-to-machine (M2M) communication. In addition, the terminal equipment may be a wireless communication module (such as an integrated circuit module including a single wafer) installed on each of the terminals.

8-1. Application Example On Base Station

First Application Example

Figure 18:
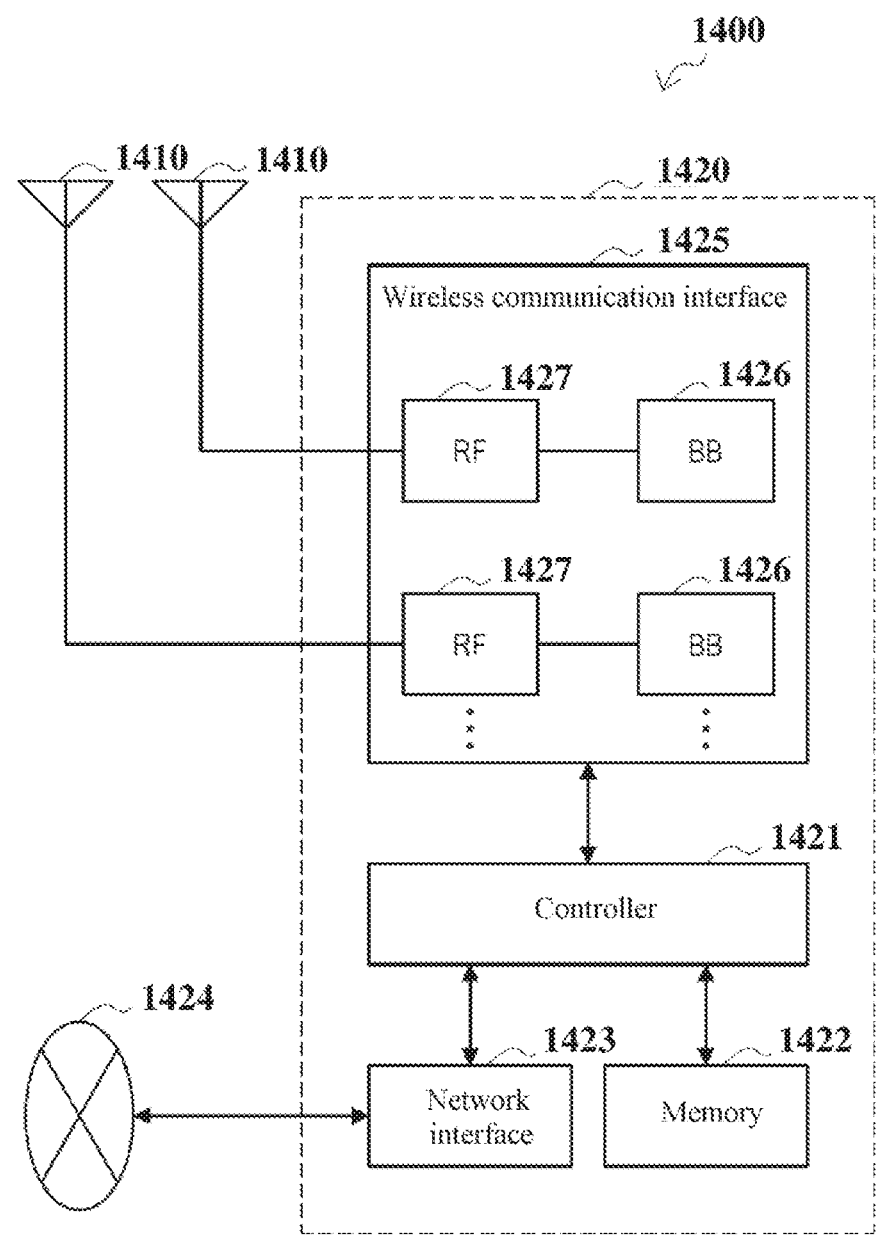
FIG. 18 is a block diagram showing a first schematic configuration example of an evolved Node B (eNB)

FIG. 18 is a block diagram showing a first schematic configuration example of an eNB to which the technology of the present disclosure may be applied. An eNB 1400 includes one or more antennas 1410 and a base station device 1420. The base station device 1420 and each antenna 1410 may be connected to each other via an RF cable.

Each of the antennas 1410 includes a single or multiple antenna elements (such as multiple antenna elements included in a multiple-input multiple-output (MIMO) antenna), and is used for the base station device 1420 to transmit and receive wireless signals. As shown in FIG. 18, the eNB 1400 may include the multiple antennas 1410. For example, the multiple antennas 1410 may be compatible with multiple frequency bands used by the eNB 1400. Although FIG. 18 shows the example in which the eNB 1400 includes the multiple antennas 1410, the eNB 1400 may also include a single antenna 1410.

The base station device 1420 includes a controller 1421, a memory 1422, a network interface 1423, and a wireless communication interface 1425.

The controller 1421 may be, for example, a CPU or a DSP and operates various functions of a higher layer of the base station device 1420. For example, the controller 1421 generates a data packet from data in a signal processed by the wireless communication interface 1425, and transfers the generated packet via the network interface 1423. The controller 1421 may bundle data from multiple base band processors to generate the bundled packet, and transfer the generated bundled packet. The controller 1421 may have logical functions of performing control such as radio resource control, radio bearer control, mobility management, admission control and scheduling. The control may be performed in corporation with an eNB or a core network node in the vicinity. The memory 1422 includes a RAM and a ROM, and stores a program executed by the controller 1421, and various types of control data (such as a terminal list, transmission power data, and scheduling data).

The network interface 1423 is a communication interface for connecting the base station device 1420 to a core network 1424. The controller 1421 may communication with a core network node or another eNB via the network interface 1423. In this case, the eNB 1400 and the core network node or the another eNB may be connected to each other via a logical interface (such as an S1 interface and an X2 interface). The network interface 1423 may also be a wired communication interface or a wireless communication interface for wireless backhaul. If the network interface 1423 is a wireless communication interface, the network interface 1423 may use a higher frequency band for wireless communication than a frequency band used by the wireless communication interface 1425.

The wireless communication interface 1425 supports any cellular communication scheme (such as long term evolution (LTE) and LTE-advanced), and provides wireless connection to a terminal located in a cell of the eNB 1400 via the antenna 1410. The wireless communication interface 1425 may typically include, for example, a base band (BB) processor 1426 and an RF circuit 1427. The BB processor 1426 may perform, for example, encoding/decoding, modulating/demodulating, and multiplexing/demultiplexing, and perform various types of signal processing of layers (such as L1, medium access control (MAC), radio link control (RLC) and a packet data convergence protocol (PDCP)). The BB processor 1426 may have a part or all of the above logical functions instead of the controller 1421. The BB processor 1426 may be a memory that stores a communication control program, or a module that includes a processor and a related circuit configured to execute the program. Updating the program may allow the functions of the BB processor 1426 to be changed. The module may be a card or a blade that is inserted into a slot of the base station device 1420. Alternatively, the module may also be a chip that is installed on the card or the blade. Meanwhile, the RF circuit 1427 may include, for example, a mixer, a filter, and an amplifier, and transmits and receives wireless signals via the antenna 1410.

As shown in FIG. 18, the wireless communication interface 1425 may include the multiple BB processors 1426. For example, the multiple BB processors 1426 may be compatible with multiple frequency bands used by the eNB 1400. As shown in FIG. 18, the wireless communication interface 1425 may include the multiple RF circuits 1427. For example, the multiple RF circuits 1427 may be compatible with multiple antenna elements. Although FIG. 18 shows the example in which the wireless communication interface 1425 includes the multiple BB processors 1426 and the multiple RF circuits 1427, the wireless communication interface 1425 may also include a single BB processor 1426 or a single RF circuit 1427.

Second Application Example

Figure 19:
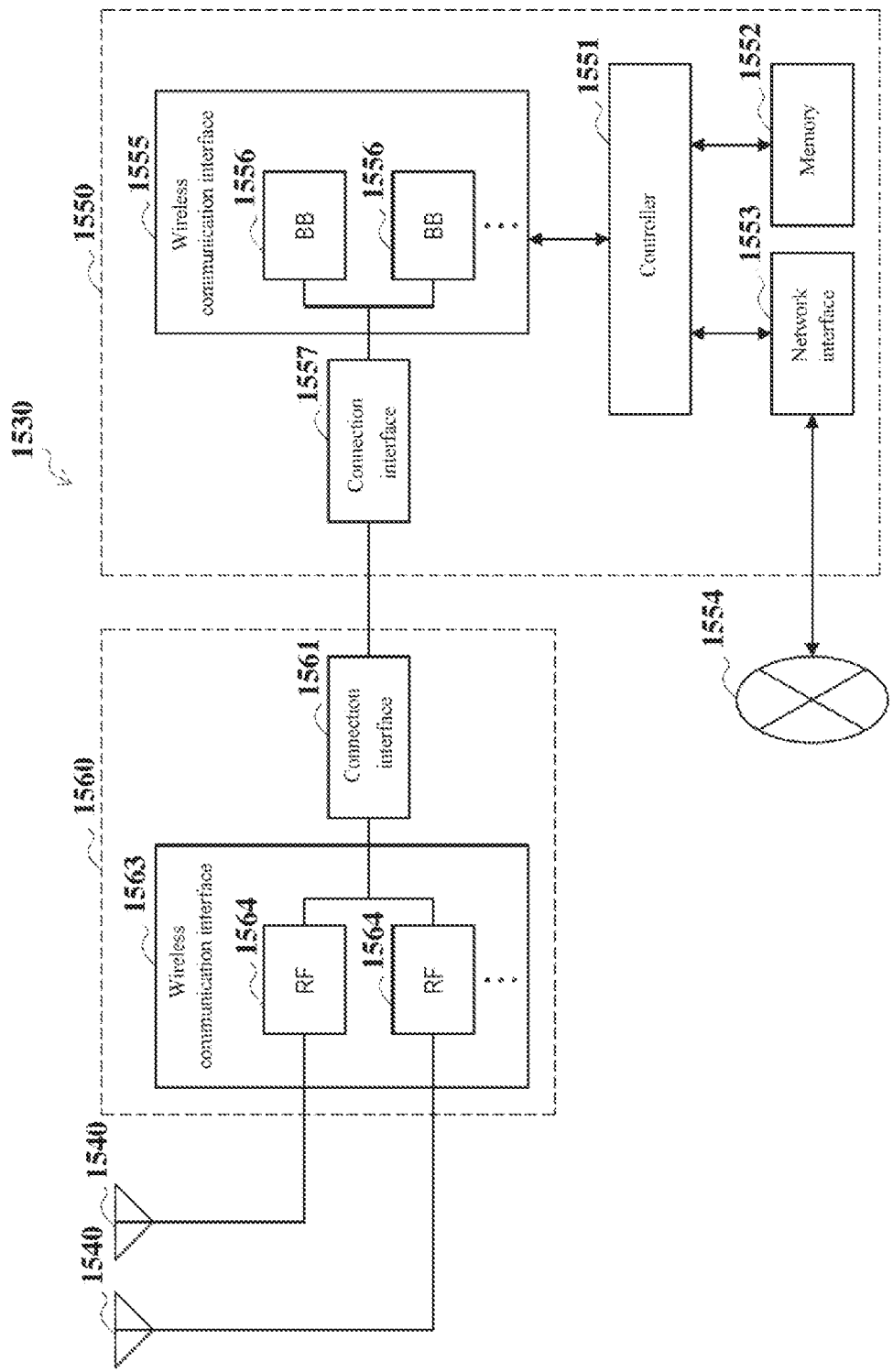
FIG. 19 is a block diagram showing a second schematic configuration example of the eNB.

FIG. 19 is a block diagram showing a second schematic configuration example of an eNB to which the technology of the present disclosure may be applied. An eNB 1530 includes one or more antennas 1540, a base station device 1550, and an RRH 1560. The RRH 1560 and each antenna 1540 may be connected to each other via an RF cable. The base station device 1550 and the RRH 1560 may be connected to each other via a high speed line such as an optical fiber cable.

Each of the antennas 1540 includes a single or multiple antenna elements (such as multiple antenna elements included in an MIMO antenna), and is used for the RRH 1560 to transmit and receive wireless signals. As shown in FIG. 19, the eNB 1530 may include the multiple antennas 1540. For example, the multiple antennas 1540 may be compatible with multiple frequency bands used by the eNB 1530. Although FIG. 19 shows the example in which the eNB 1530 includes the multiple antennas 1540, the eNB 1530 may also include a single antenna 1540.

The base station device 1550 includes a controller 1551, a memory 1552, a network interface 1553, a wireless communication interface 1555, and a connection interface 1557. The controller 1551, the memory 1552, and the network interface 1553 are the same as the controller 1421, the memory 1422, and the network interface 1423 described with reference to FIG. 18.

The wireless communication interface 1555 supports any cellular communication scheme (such as LTE and LTE-Advanced) and provides wireless communication to a terminal located in a sector corresponding to the RRH 1560 via the RRH 1560 and the antenna 1540. The wireless communication interface 1555 may typically include, for example, a BB processor 1556. The BB processor 1556 is the same as the BB processor 1426 described with reference to FIG. 18, except the BB processor 1556 is connected to an RF circuit

1564 of the RRH 1560 via the connection interface 1557. As show in FIG. 19, the wireless communication interface 1555 may include the multiple BB processors 1556. For example, the multiple BB processors 1556 may be compatible with multiple frequency bands used by the eNB 1530. Although FIG. 19 shows the example in which the wireless communication interface 1555 includes the multiple BB processors 1556, the wireless communication interface 1555 may also include a single BB processor 1556.

The connection interface 1557 is an interface for connecting the base station device 1550 (wireless communication interface 1555) to the RRH 1560. The connection interface 1557 may also be a communication module for communication in the above-described high speed line that connects the base station device 1550 (wireless communication interface 1555) to the RRH 1560.

The RRH 1560 includes a connection interface 1561, and a wireless communication interface 1563.

The connection interface 1561 is an interface for connecting the RRH 1560 (wireless communication interface 1563) to the base station device 1550. The connection interface 1561 may also be a communication module for communication in the above-described high speed to line.

The wireless communication interface 1563 transmits and receives wireless signals via the antenna 1540. The wireless communication interface 1563 may typically include, for example, the RF circuit 1564. The RF circuit 1564 may include, for example, a mixer, a filter, and an amplifier, and transmits and receives wireless signals via the antenna 1540. As shown in FIG. 19, the wireless communication interface 1563 may include multiple RF circuits 1564. For example, the multiple RF circuits 1564 may support multiple antenna elements. Although FIG. 19 shows the example in which the wireless communication interface 1563 includes the multiple RF circuits 1564, the wireless communication interface 1563 may also include a single RF circuit 1564.

In the eNB 1400 shown in FIG. 18 and the eNB 1530 shown in FIG. 19, the processing circuit 1010 described with reference to FIG. 10 and the processing circuit 1210 described with reference to FIG. 12 may be implemented by the controller 1421 and/or the controller 1551. At least a part of functions may be implemented by the controller 1421 and the controller 1551. For example, the controller 1421 and/or the controller 1551 may perform a function of determining optimized transmitting beam directions of terminal equipment and performing a channel detection process by executing instructions stored in the corresponding memory.

8-2. Application Example on Terminal Equipment

First Application Example

Figure 20:
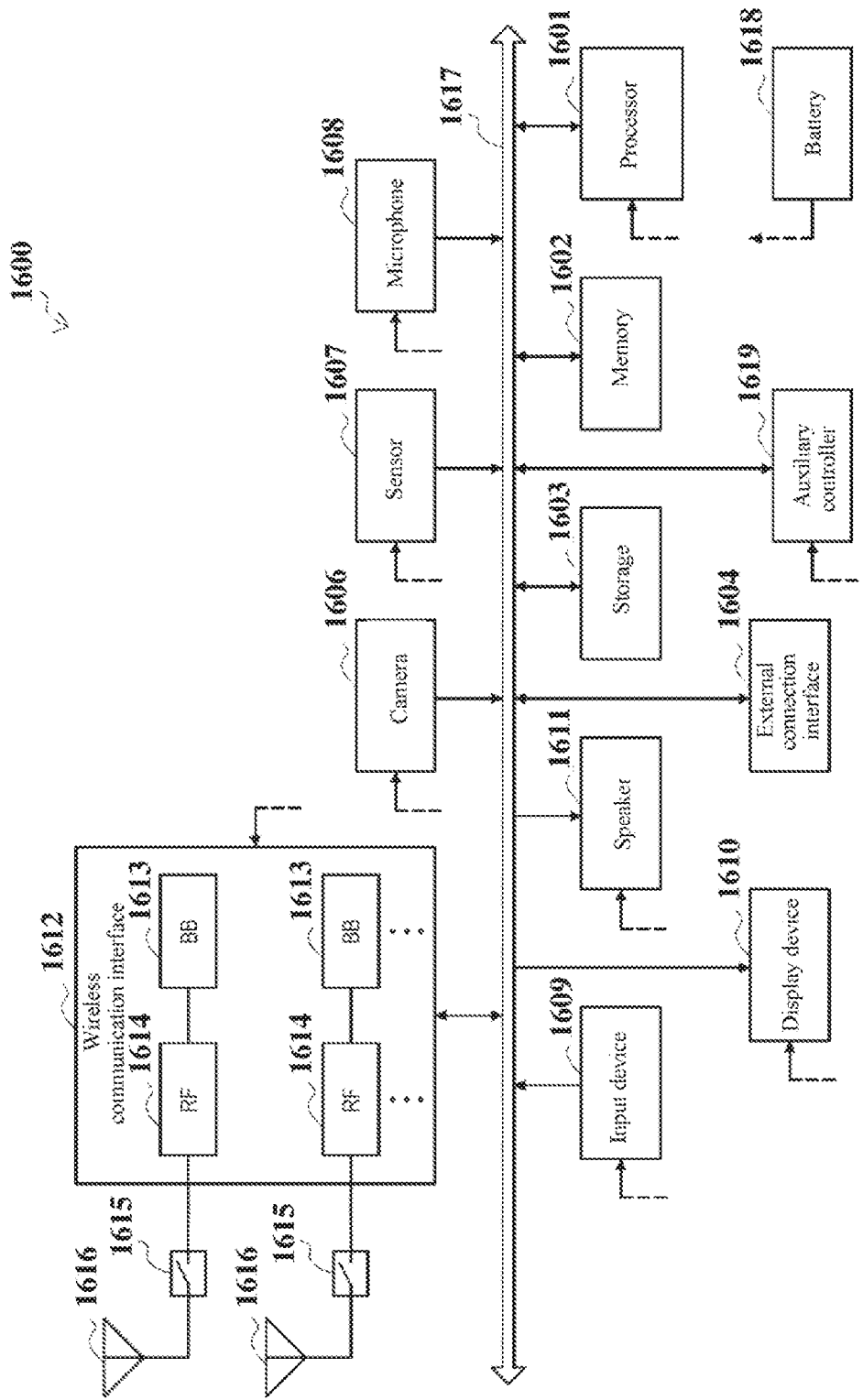
FIG. 20 is a block diagram showing a schematic configuration example of a smart phone.

FIG. 20 is a block diagram showing a schematic configuration example of a smart phone 1600 to which the technology of the present disclosure may be applied. The smart phone 1600 includes a processor 1601, a memory 1602, a storage 1603, an external connection interface 1604, a camera 1606, a sensor 1607, a microphone 1608, an input device 1609, a display device 1610, a speaker 1611, a wireless communication interface 1612, one or more antenna switches 1615, one or more antennas 1616, a bus 1617, a battery 1618, and an auxiliary controller 1619.

The processor 1601 may be, for example, a CPU or a system on a chip (SoC), and controls functions of an application layer and another layer of the smart phone 1600. The memory 1602 includes a RAM and a ROM, and stores a program that is executed by the processor 1601, and data. The storage 1603 may include a storage medium such as a semiconductor memory and a hard disk. The external connection interface 1604 is an interface for connecting an external device (such as a memory card and a universal serial bus (USB) device) to the smart phone 1600.

The camera 1606 includes an image sensor (such as a charge coupled device (CCD) and a complementary metal oxide semiconductor (CMOS)), and generates a captured image. The sensor 1607 may include a group of sensors such as a measurement sensor, a gyro sensor, a geomagnetic sensor, and an acceleration sensor. The microphone 1608 converts sounds that are inputted to the smart phone 1600 into audio signals. The input device 1609 includes, for example, a touch sensor configured to detect touch onto a screen of the display device 1610, a keypad, a keyboard, a button, or a switch, and receive an operation or information inputted from a user. The display device 1610 includes a screen (such as a liquid crystal display (LCD) and an organic light-emitting diode (OLED) display), and displays an output image of the smart phone 1600. The speaker 1611 converts audio signals that are outputted from the smart phone 1600 to sounds.

The wireless communication interface 1612 supports any cellular communication scheme (such as LTE and LTE-Advanced), and performs wireless communication. The wireless communication interface 1612 may typically include, for example, a BB processor 1613 and an RF circuit 1614. The BB processor 1613 may perform, for example, encoding/decoding, modulating/demodulating, and multiplexing/demultiplexing, and performs various types of signal processing for wireless communication. Meanwhile, the RF circuit 1614 may include, for example, a mixer, a filter, and an amplifier, and transmits and receives wireless signals via the antenna 1616. The wireless communication interface 1612 may be a chip module having the BB processor 1613 and the RF circuit 1614 integrated thereon. As shown in FIG. 20, the wireless communication interface 1612 may include multiple BB processors 1613 and multiple RF circuits 1614. Although FIG. 20 shows the example in which the wireless communication interface 1612 includes the multiple BB processors 1613 and the multiple RF circuits 1614, the wireless communication interface 1612 may also include a single BB processor 1613 or a single RF circuit 1614.

Furthermore, in addition to a cellular communication scheme, the wireless communication interface 1612 may support another type of wireless communication scheme such as a short-distance wireless communication scheme, a near field communication scheme, and a wireless local area network (LAN) scheme. In this case, the wireless communication interface 1612 may include the BB processor 1613 and the RF circuit 1614 for each wireless communication scheme.

Each of the antenna switches 1615 switches connection destinations of the antennas 1616 among multiple circuits (such as circuits for different wireless communication schemes) included in the wireless communication interface 1612.

Each of the antennas 1616 includes a single or multiple antenna elements (such as multiple antenna elements included in an MIMO antenna), and is used for the wireless communication interface 1612 to transmit and receive wireless signals. As shown in FIG. 20, the smart phone 1600 may include the multiple antennas 1616. Although FIG. 20 illustrates the example in which the smart phone 1600 includes the multiple antennas 1616, the smart phone 1600 may also include a single antenna 1616.

Furthermore, the smart phone 1600 may include the antenna 1616 for each wireless communication scheme. In this case, the antenna switches 1615 may be omitted from the configuration of the smart phone 1600.

The bus 1617 connects the processor 1601, the memory 1602, the storage 1603, the external connection interface 1604, the camera 1606, the sensor 1607, the microphone 1608, the input device 1609, the display device 1610, the speaker 1611, the wireless communication interface 1612, and the auxiliary controller 1619 to each other. The battery 1618 supplies power to blocks of the smart phone 1600 shown in FIG. 20 via feeder lines that are partially shown as dashed lines in FIG. 20. The auxiliary controller 1619 operates a minimum necessary function of the smart phone 1600, for example, in a sleep mode.

In the smart phone 1600 shown in FIG. 20, the processing circuit 210 described with reference to FIG. 2 may be implemented by the processor 1601 or the auxiliary controller 1619. At least a part of functions may be implemented by the processor 1601 or the auxiliary controller 1619. For example, the processor 1601 or the auxiliary controller 1619 may perform a function of performing a channel detection process by executing instructions stored in the memory 1602 or the storage 1603.

Second Application Example

Figure 21:
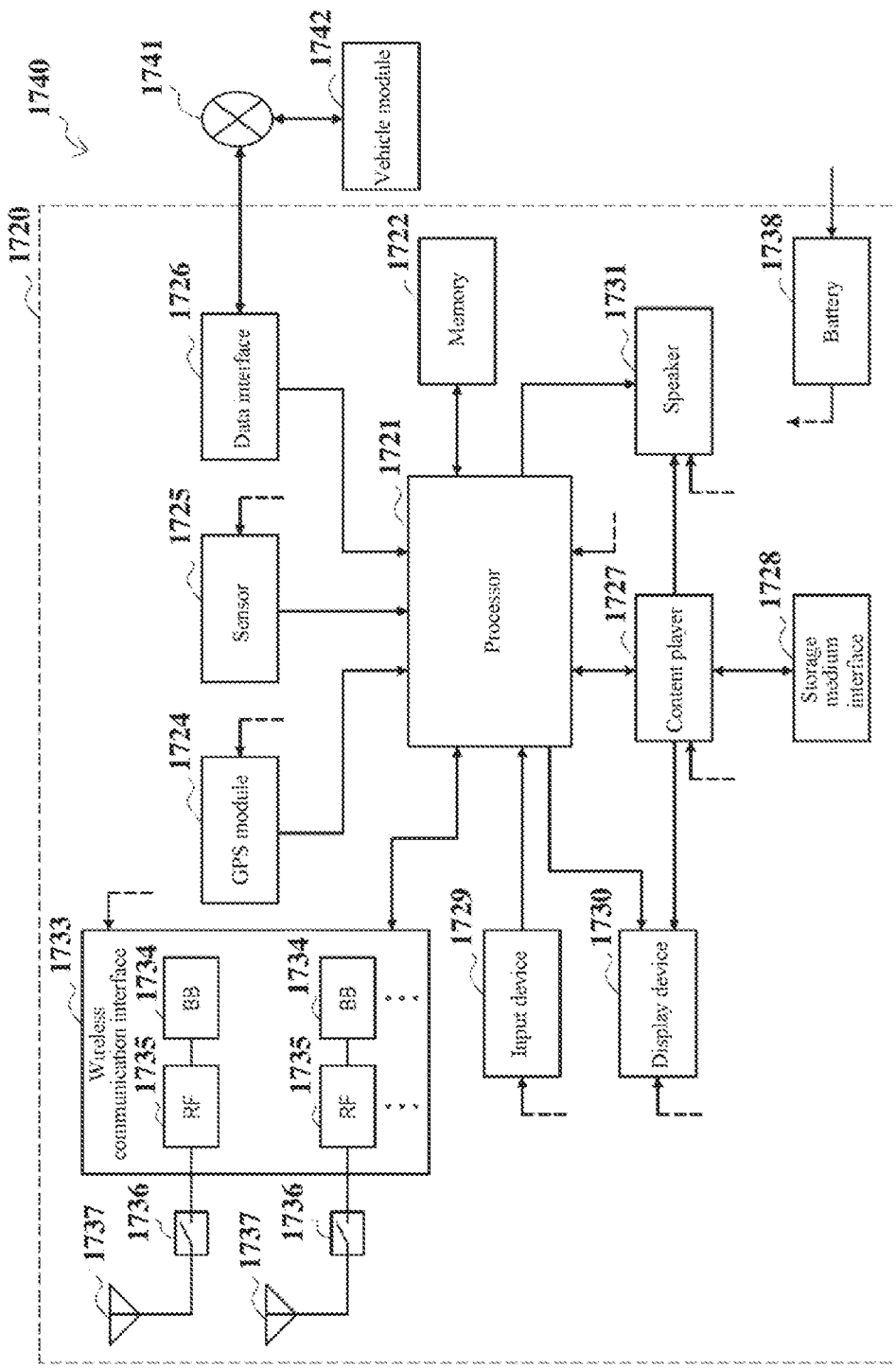
FIG. 21 is a block diagram showing a schematic configuration example of a car navigation device.

FIG. 21 is a block diagram showing a schematic configuration example of a car navigation device 1720 to which the technology of the present disclosure may be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, a wireless communication interface 1733, one or more antenna switches 1736, one or more antennas 1737, and a battery 1738.

The processor 1721 may be, for example, a CPU or an SoC, and controls a navigation function and another function of the car navigation device 1720. The memory 1722 includes a RAM and a ROM, and stores a program that is executed by the processor 1721 and data.

The GPS module 1724 determines a position (such as latitude, longitude, and altitude) of the car navigation device 1720 by using GPS signals received from a GPS satellite. The sensor 1725 may include a group of sensors such as a gyro sensor, a geomagnetic sensor, and an air pressure sensor. The data interface 1726 is connected to, for example, an in-vehicle network 1741 via a terminal that is not shown, and acquires data (such as vehicle speed data) generated by the vehicle.

The content player 1727 reproduces content stored in a storage medium (such as a CD and a DVD) that is inserted into the storage medium interface 1728. The input device 1729 includes, for example, a touch sensor configured to detect touch onto a screen of the display device 1730, a button or a switch, and receives an operation or information inputted from a user. The display device 1730 includes a screen such as a LCD or an OLED display, and displays an image of the navigation function or content that is reproduced. The speaker 1731 outputs sounds of the navigation function or the content that is reproduced.

The wireless communication interface 1733 supports any cellular communication scheme (such as LTE and LTE-advanced), and performs wireless communication. The wireless communication interface 1733 may typically include, for example, a BB processor 1734 and an RF circuit 1735. The BB processor 1734 may perform, for example, encoding/decoding, modulating/demodulating, and multiplexing/demultiplexing, and performs various types of signal processing for wireless communication. Meanwhile, the RF circuit 1735 may include, for example, a mixer, a filter, and an amplifier, and transmits and receives wireless signals via the antenna 1737. The wireless communication interface 1733 may also be a chip module having the BB processor 1734 and the RF circuit 1735 integrated thereon. As shown in FIG. 21, the wireless communication interface 1733 may include the multiple BB processors 1734 and the multiple RF circuits 1735. Although FIG. 21 shows the example in which the wireless communication interface 1733 includes the multiple BB processors 1734 and the multiple RF circuits 1735, the wireless communication interface 1733 may also include a single BB processor 1734 or a single RF circuit 1735.

Furthermore, in addition to a cellular communication scheme, the wireless communication interface 1733 may support another type of wireless communication scheme such as a short-distance wireless communication scheme, a near field communication scheme, and a wireless LAN scheme. In that case, the wireless communication interface 1733 may include the BB processor 1734 and the RF circuit 1735 for each wireless communication scheme.

Each of the antenna switches 1736 switches connection destinations of the antennas 1737 among multiple circuits (such as circuits for different wireless communication schemes) included in the wireless communication interface 1733.

Each of the antennas 1737 includes a single or multiple antenna elements (such as multiple antenna elements included in an MIMO antenna), and is used for the wireless communication interface 1733 to transmit and receive wireless signals. As shown in FIG. 21, the car navigation device 1720 may include the multiple antennas 1737. Although FIG. 21 shows the example in which the car navigation device 1720 includes the multiple antennas 1737, the car navigation device 1720 may also include a single antenna 1737.

Furthermore, the car navigation device 1720 may include the antenna 1737 for each wireless communication scheme. In that case, the antenna switches 1736 may be omitted from the configuration of the car navigation device 1720.

The battery 1738 supplies power to blocks of the car navigation device 1720 shown in FIG. 21 via feeder lines that are partially shown as dashed lines in FIG. 21. The battery 1738 accumulates power supplied from the vehicle.

In the car navigation device 1720 shown in FIG. 21, the processing circuit 210 described with reference to FIG. 2 may be implemented by the processor 1721. At least a part of functions may be implemented by the processor 1721. For example, the processor 1721 may perform a function of performing a channel detection process by executing instructions stored in the memory 1722.

The technology of the present disclosure may also be implemented as an in-vehicle system (or a vehicle) 1740 including one or more blocks of the car navigation device 1720, the in-vehicle network 1741 and a vehicle module 1742. The vehicle module 1742 generates vehicle data (such as a vehicle speed, an engine speed, or failure information), and outputs the generated data to the in-vehicle network 1741.

In the system and the method of the present disclosure, it is apparent that various components or steps may be decomposed and/or recombined. These decomposition and/or recombination should be regarded as equivalent solutions of the present disclosure. In addition, the steps performing a series of processing above may be performed in the describing order naturally, but it is not necessary. Some steps may be performed concurrently or independently with each other.

In addition, the present disclosure may include the following configuration.

(1). An electronic equipment in a wireless communication system, comprising:
a processing circuit configured to perform a channel detection process on one or more beam directions of an unlicensed spectrum; and
a transceiver circuit configured to transmit a random access preamble sequence in one or more beam directions in which channel detection is idle.

(2). The electronic equipment according to (1), wherein the transceiver circuit is further configured to receive beam direction information and the processing circuit is further configured to perform the channel detection process on one or more beam directions included in the beam direction information in sequence.

(3). The electronic equipment according to (1), wherein each beam direction of the unlicensed spectrum comprises a plurality of sub-beam directions, and the transceiver circuit is configured to transmit the random access preamble sequence in the plurality of sub-beam directions included in each beam direction in which channel detection is idle.

(4). The electronic equipment according to (1), wherein the transceiver circuit is further configured to transmit different random access preamble sequences for different beam directions.

(5). The electronic equipment according to (1), wherein the transceiver circuit is further configured to transmit the random access preamble sequence for the beam direction, one or more times, in each beam direction in which channel detection is idle.

(6). The electronic equipment according to (5), wherein the processing circuit is further configured to determine the number of times of the random access preamble sequence transmitted for the beam direction in each beam direction in which channel detection is idle, according to Maximum Channel Occupancy Time (MCOT).

(7). The electronic equipment according to (1), wherein the processing circuit is further configured to start a timer in the beginning of the channel detection process performed in the current beam direction, and start to perform the channel detection process on the next beam direction if the current beam direction is not detected to be idle before the timer expires.

(8). The electronic equipment according to (1), wherein the processing circuit is further configured to start a random access response window for the transceiver circuit to receive a random access response message.

(9). The electronic equipment according to (8), wherein the processing circuit is further configured to start the random access response window after the transceiver circuit transmits the random access preamble sequence in all beam directions in which channel detection is idle.

(10). The electronic equipment according to (8), wherein the processing circuit is further configured to start the random access response window after the transceiver circuit transmits the random access preamble sequence for the first time in the first beam direction in which channel detection is idle.

(11). The electronic equipment according to (8), wherein the processing circuit is configured to start the random access response window for each beam direction in which channel detection is idle after the transceiver circuit transmits the random access preamble sequence for the first time in the beam direction.

(12). The electronic equipment according to (8), wherein the processing circuit is further configured to determine a beam direction of an unlicensed spectrum for transmitting uplink data, according to the received random access response message.

(13). The electronic equipment according to (8), wherein the processing circuit is further configured to re-perform the channel detection process on one or more beam directions in which channel detection is busy in case of not receiving the random access response message.

(14). The electronic equipment according to (13), wherein the processing circuit is further configured to extend the length of the timer set for each beam direction in which channel detection is busy until each beam direction is detected to be idle and to transmit the random access preamble sequence in each beam direction.

(15). The electronic equipment according to (14), wherein the processing circuit is further configured to improve the transmission power of the random access preamble sequence in each beam direction.

(16). The electronic equipment according to (8), wherein the processing circuit is further configured to determine a beam direction of the unlicensed spectrum for transmitting an uplink transmission message according to the received random access response message, and the transceiver circuit is further configured to transmit the uplink transmission message.

(17). The electronic equipment according to (16), wherein the uplink transmission message comprises a Radio Resource Control (RRC) connection request message, the RRC connection request message comprising identification information of the electronic equipment.

(18). The electronic equipment according to (17), wherein the RRC connection request message further comprises uplink data.

(19). The electronic equipment according to (16), wherein the transceiver circuit is further configured to receive a transmission response message of the uplink transmission message.

(20). The electronic equipment according to (19), wherein the transmission response message comprises a Radio Resource Control (RRC) connection response message, the RRC connection response message comprising identification information of the electronic equipment.

(21). The electronic equipment according to any one of (1) to (20), wherein the wireless communication system is a New Wireless (NR) communication system, and the electronic equipment is a terminal equipment.

(22). An electronic equipment in a wireless communication system, comprising:
a processing circuit configured to determine one or more optimized transmitting beam directions of terminal equipment within the coverage area of the electronic equipment; and a transceiver circuit configured to transmit, to the terminal equipment, beam direction information including the one or more optimized transmitting beam directions.

(23). The electronic equipment according to (22), wherein the transceiver circuit is further configured to transmit a random access response message to the terminal equipment, the random access response message comprising a random access preamble sequence received by the transceiver circuit.

(24). The electronic equipment according to (22) or (23), wherein the wireless communication system is a New Wireless (NR) communication system, and the electronic equipment is a network side equipment.

(25). An electronic equipment in a wireless communication system, comprising:
a processing circuit configured to perform a channel detection process on one or more beam directions of an unlicensed spectrum; and
a transceiver circuit configured to transmit a random access response message in one or more beam directions in which channel detection is idle, the random access response message comprising a random access preamble sequence received by the transceiver circuit.

(26). The electronic equipment according to (25), wherein the transceiver circuit is further configured to receive an uplink transmission message from terminal equipment within the coverage area of the electronic equipment.

(27). The electronic equipment according to (26), wherein the uplink transmission message comprises a Radio Resource Control (RRC) connection request message, the RRC connection request message comprising identification information of the terminal equipment.

(28). The electronic equipment according to (27), wherein the RRC connection request message further comprises uplink data.

(29). The electronic equipment according to (26), wherein the transceiver circuit is further configured to transmit a transmission response message of the uplink transmission message to terminal equipment being allowed to access the electronic equipment.

(30). The electronic equipment according to (29), wherein the transmission response message comprises a Radio Resource Control (RRC) connection response message, the RRC connection response message comprising identification information of the terminal equipment being allowed to access the electronic equipment.

(31). The electronic equipment according to (29), wherein the processing circuit is further configured to reserve the unlicensed spectrum used in transmission of the random access response message for transmitting the uplink transmission message by the terminal equipment within the coverage area of the electronic equipment; and transmitting, by the electronic equipment, the transmission response message of the uplink transmission message to the terminal equipment being allowed to access the electronic equipment.

(32). The electronic equipment according to any one of (25) to (31), wherein the wireless communication system is a New Wireless (NR) communication system, and the electronic equipment is a network side equipment.

(33). A wireless communication method executed by electronic equipment in a wireless communication system, comprising:
performing a channel detection process on one or more beam directions of an unlicensed spectrum; and
transmitting a random access preamble sequence in one or more beam directions in which channel detection is idle.

(34). A wireless communication method executed by electronic equipment in a wireless communication system, comprising:
performing a channel detection process on one or more beam directions of an unlicensed spectrum; and
transmitting a random access response message in one or more beam directions in which channel detection is idle, the random access response message comprising a random access preamble sequence received by the electronic equipment.

While the embodiments of the present disclosure have been described in detail with reference to the drawings, it should be understood that the above described embodiments are merely used to illustrate the present disclosure and are not intended to limit the present disclosure. For those skilled in the art, various modifications and variations may be made on the above described embodiments without departing from the essence and scope of the present disclosure. Accordingly, the scope of the present disclosure is defined only by the appended claims and equivalents thereof.

The invention claimed is:

1. An electronic equipment in a wireless communication system, comprising:
circuitry configured to
perform a channel detection process on one or more beam directions of an unlicensed spectrum, each beam direction being configured by binding two or more sub-beam directions, the two or more sub-beam directions being adjacent uplink directions around the electronic equipment;
transmit a random access preamble sequence in each of the two or more sub-beam directions included in the one or more beam directions in which channel detection is idle, respectively;
start a random access response window to receive a random access response message;
determine a certain beam direction of the unlicensed spectrum for transmitting an uplink transmission message according to the received random access response message; and
transmit the uplink transmission message via the determined beam direction,
wherein the channel detection process is performed based on beam direction information as a first priority, the channel detection process is performed based on the beam direction configured by binding two or more sub-beam directions as a second priority, and the channel detection process is performed based on all beam direction as a third priority.

2. The electronic equipment according to claim 1, wherein the circuitry is further configured to start the random access response window after the circuitry transmits the random access preamble sequence in all beam directions in which channel detection is idle; or
start the random access response window after the circuitry transmits the random access preamble sequence for a first time in a first beam direction in which channel detection is idle; or
start the random access response window for each beam direction in which channel detection is idle after the circuitry transmits the random access preamble sequence for the first time in the beam direction.

3. The electronic equipment according to claim 1, wherein the circuitry is further configured to re-perform the channel detection process on one or more beam directions in which channel detection is busy in case of not receiving the random access response message.

4. The electronic equipment according to claim 3, wherein the circuitry is further configured to extend a length of a timer set for each beam direction in which channel detection is busy until each beam direction is detected to be idle and to transmit the random access preamble sequence in each beam direction, and
wherein the circuitry is further configured to improve the transmission power of the random access preamble sequence in each beam direction.

5. The electronic equipment according to claim 1, wherein the uplink transmission message comprises a Radio Resource Control (RRC) connection request message, the RRC connection request message comprising identification information of the electronic equipment and uplink data.

6. The electronic equipment according to claim 1, wherein the circuitry is further configured to receive a transmission response message of the uplink transmission message.

7. The electronic equipment according to claim 6, wherein the transmission response message comprises a Radio Resource Control (RRC) connection response message, the RRC connection response message comprising identification information of the electronic equipment.

8. An electronic equipment in a wireless communication system, comprising:
   circuitry configured to
   perform a channel detection process on one or more beam directions of an unlicensed spectrum, each beam direction being configured by binding two or more sub-beam directions, the two or more sub-beam directions being adjacent uplink directions around the electronic equipment; and
   transmit a random access response message in each of the two or more sub-beam directions included in the one or more beam directions in which channel detection is idle, respectively, the random access response message comprising a random access preamble sequence,
   wherein the channel detection process is performed based on beam direction information as a first priority, the channel detection process is performed based on the beam direction configured by binding two or more sub-beam directions as a second priority, and the channel detection process is performed based on all beam direction as a third priority.

9. The electronic equipment according to claim 8, wherein the circuitry is further configured to receive an uplink transmission message from terminal equipment within a coverage area of the electronic equipment.

10. The electronic equipment according to claim 9, wherein the uplink transmission message comprises a Radio Resource Control (RRC) connection request message, the RRC connection request message comprising identification information of the terminal equipment and uplink data.

11. The electronic equipment according to claim 9, wherein the circuitry is further configured to transmit a transmission response message of the uplink transmission message to terminal equipment being allowed to access the electronic equipment, and
   wherein the transmission response message comprises a Radio Resource Control (RRC) connection response message, the RRC connection response message comprising identification information of the terminal equipment being allowed to access the electronic equipment.

12. The electronic equipment according to claim 11, wherein the circuitry is further configured to reserve the unlicensed spectrum used in transmission of the random access response message for transmitting the uplink transmission message by the terminal equipment within the coverage area of the electronic equipment; and transmitting, by the electronic equipment, the transmission response message of the uplink transmission message to the terminal equipment being allowed to access the electronic equipment.

13. A wireless communication method executed by electronic equipment in a wireless communication system, comprising:
   performing a channel detection process on one or more beam directions of an unlicensed spectrum, each beam direction being configured by binding two or more sub-beam directions, the two or more sub-beam directions being adjacent uplink directions around the electronic equipment; and
   transmitting a random access preamble sequence in each of the two or more sub-beam directions included in the one or more beam directions in which channel detection is idle, respectively;
   starting a random access response window to receive a random access response message;
   determining a certain beam direction of the unlicensed spectrum for transmitting an uplink transmission message according to the received random access response message; and
   transmitting the uplink transmission message via the determined beam direction,
   wherein the channel detection process is performed based on beam direction information as a first priority, the channel detection process is performed based on the beam direction configured by binding two or more sub-beam directions as a second priority, and the channel detection process is performed based on all beam direction as a third priority.

* * * * *